United States Patent [19]
Shintani

[11] Patent Number: 5,094,116
[45] Date of Patent: Mar. 10, 1992

[54] PLANETARY GEARING

[75] Inventor: Dai Shintani, Sakai, Japan

[73] Assignee: Minolta Camera Kabushiki Kaisha, Osaka, Japan

[21] Appl. No.: 677,139

[22] Filed: Mar. 29, 1991

[30] Foreign Application Priority Data

Mar. 31, 1990 [JP] Japan ................ 2-34707[U]

[51] Int. Cl.⁵ .............................................. F16H 3/34
[52] U.S. Cl. .......................................... 74/354; 475/5; 475/6
[58] Field of Search ............ 74/332, 338, 343, 346, 74/354, 384; 475/5, 6

[56] References Cited

U.S. PATENT DOCUMENTS

| | | | |
|---|---|---|---|
| 829,068 | 8/1906 | Fox | 74/354 |
| 2,506,562 | 5/1950 | Wait | 74/354 X |
| 2,979,174 | 4/1961 | Mercier | 74/354 X |
| 2,985,029 | 5/1961 | Schneider | 74/354 X |
| 3,004,482 | 10/1961 | Muller | 74/354 X |
| 3,637,055 | 10/1972 | Young | 74/354 X |
| 4,760,751 | 8/1988 | Kasamatsu | 74/354 |
| 4,910,543 | 3/1990 | Kawamura et al. | 354/173.1 |

FOREIGN PATENT DOCUMENTS 55-98727  7/1980 Japan .
55-103543 8/1980 Japan .
62-39379 10/1987 Japan .
62-240944 10/1987 Japan .

Primary Examiner—Leslie A. Braun
Assistant Examiner—William O. Trousdell
Attorney, Agent, or Firm—Willian Brinks Olds Hofer Gilson & Lione

[57] ABSTRACT

An planetary gearing in which a planetary gear is positioned at three or more positions. A sun gear and a planetary carrier are co-axially and rotatably arranged. A planetary gear is rotatably supported by the planetary carrier to engage the sun gear. A plurality of transmission gears are arranged around the sun gear to be selectively engaged with the planetary gear when the planetary gear revolves around the sun gear. Stopper projections are provided on the planetary carrier, each corresponding to each of the transmission gears. An engagement lever is rotatably arranged to take a first position and a second position. The engagement lever at the first position holds the planetary carrier, by selectively engaging one of the stopper projections, to make the planetary gear engage the corresponding transmission gear. On the contrary, the engagement lever at the second position is disengaged from the stopper projections. The engagement lever is controlled by a cam member so as to rotate between the first and second positions. The cam member is controlled by a control member so that the engagement lever rotates and stops at the first and second positions.

17 Claims, 19 Drawing Sheets

PLANETARY GEARING

BACKGROUND OF THE INVENTION

1. Field of the Invention

The present invention generally relates to a planetary gearing for switching a plurality of power transmitting paths. It relates more particularly to an improvement of a mechanism for positioning a planetary gear at a predetermined position in accordance with the selected power transmitting path.

2. Description of the Related Art

As well known, the planetary gearing is utilized, in different manners, for a various mechanism. Typically, the planetary gearing comprises a sun gear, a planetary carrier supported by the same shaft supporting the sun gear, a planetary gear supported by the carrier so as to engage the sun gear so that it rotates itself and travels along the periphery of the sun gear, and a plurality of power transmitting gears which are arranged adjacent to the sun gear so as to be selectively engaged with the planetary gear. Further, the planetary gear can be held at the predetermined positions to engage one of the power transmitting gears in order to transmit the rotation of the sun gear to the selected power transmitting gear.

Supposing now, in the above-mentioned arrangement, that two power transmitting gears are arranged around the sun gear, stopper means, for holding the planetary carrier carrying the planetary gear at the predetermined first and second stop positions to engage the first and and second power transmitting gears may be arranged. The stopper means are respectively constituted by simple stopper members for preventing the overrunning of the carrier by contacting the outer sides thereof at the first and second stop positions. However, in the case where the number of the power transmitting gears may increase more than two, one and more stopper means must be additionally arranged in order to hold the planetary gear at the additional intermediate stop position(s). In order to hold the carrier at the respective stop positions for the power transmitting gears, the following methods may be provided: One is a lock means including a plural lock members, which are respectively arranged to hold the carrier at the desired stop or lock positions and movable between the lock positions and the retracted positions. It may be possible to control the carrier by detecting constantly the position of the carrier. However, these methods may disadvantageously bring very complicate mechanism or system.

The planetary gearing having the above-described arrangement is utilized, for example for a camera in which it is recently required that a plural operations such as film winding and rewinding, focusing and zooming are effected by less number of motors, more specifically such a mechanism for transmitting the power to more than two transmission gears is required. It is, however, noted that regarding the camera and the like, in which the numerous members must be assembled in a narrow space in the camera body, it must be avoided to make the internal construction of the camera and the control system thereof complicated.

SUMMARY OF THE INVENTION

Accordingly, an essential object of the present invention is to provide an improved planetary gearing for use in the camera and the like which is simple in construction and easily controlled and in which the planetary gear can be located at three and more predetermined stop positions.

In accomplishing this and other objects, according to one preferred embodiment of the present invention, there is provided a planetary gearing comprising, a sun gear rotatable around a shaft, a planetary carrier rotatable around the shaft, a planetary gear rotatably supported by the planetary carrier to engage the sun gear, a plurality of transmission gears arranged around the sun gear to be selectively engaged with the planetary gear when the planetary gear revolves around the sun gear, stoppers provided on the planetary carrier, each corresponding to each of the transmission gears, an engagement lever which is rotatable to take a first position and a second position, the engagement lever at the first position holding the planetary carrier, by selectively engaging one of the stoppers, to make the planetary gear engage the corresponding transmission gear, while the engagement lever at the second position disengaging from the stoppers, cam means for rotating the engagement lever between the first and second positions, and control means for controlling a movement of the cam means so that the engagement lever rotates and stops at the first and second positions.

With the above-described arrangement, When the engagement lever is located at the first position by the cam means which is controlled by the control means, the engagement of the planetary gear and one of the transmission gear can be held so that the rotation of the sun gear may be transmitted to the selected transmission gear. When the engagement of the planetary gear and the other transmission gear is desired, the engagement lever is first disengaged from the planetary carrier by means of the cam means which is controlled by the control means, so that the planetary gear becomes shiftable. The carrier is, subsequently, rotated until it is engaged by the corresponding stopper so that the desired transmission gear is engaged with the planetary gear. In this condition, the rotation of the sun gear may be transmitted to the desired transmission.

According to the above-described arrangement, since the planetary carrier is held at the desired position to engage the selected transmission gear by the engagement lever the rotation of the sun gear in both directions can be transmitted to the selected transmission gear.

As described above, since the engagement lever can be held at a plurality of positions and the carrier is held at the desired positions by the positioned engagement lever, the planetary gear can be selectively engaged with all of the transmission gears by means of the control of only one engagement lever, without necessity of an encoder for detecting the position of the planetary gear and without necessity of the other stoppers for positioning the carrier at the intermediate positions. Accordingly, the positioning of the planetary gear with respect to the transmission gears can be effected by a simple construction.

BRIEF DESCRIPTION OF THE DRAWINGS

These and other objects and features for the present invention will become apparent from the following description taken in conjunction with the preferred embodiment thereof with reference to the accompanying drawings, in which.

DETAILED DESCRIPTION OF THE INVENTION

Figure 1:
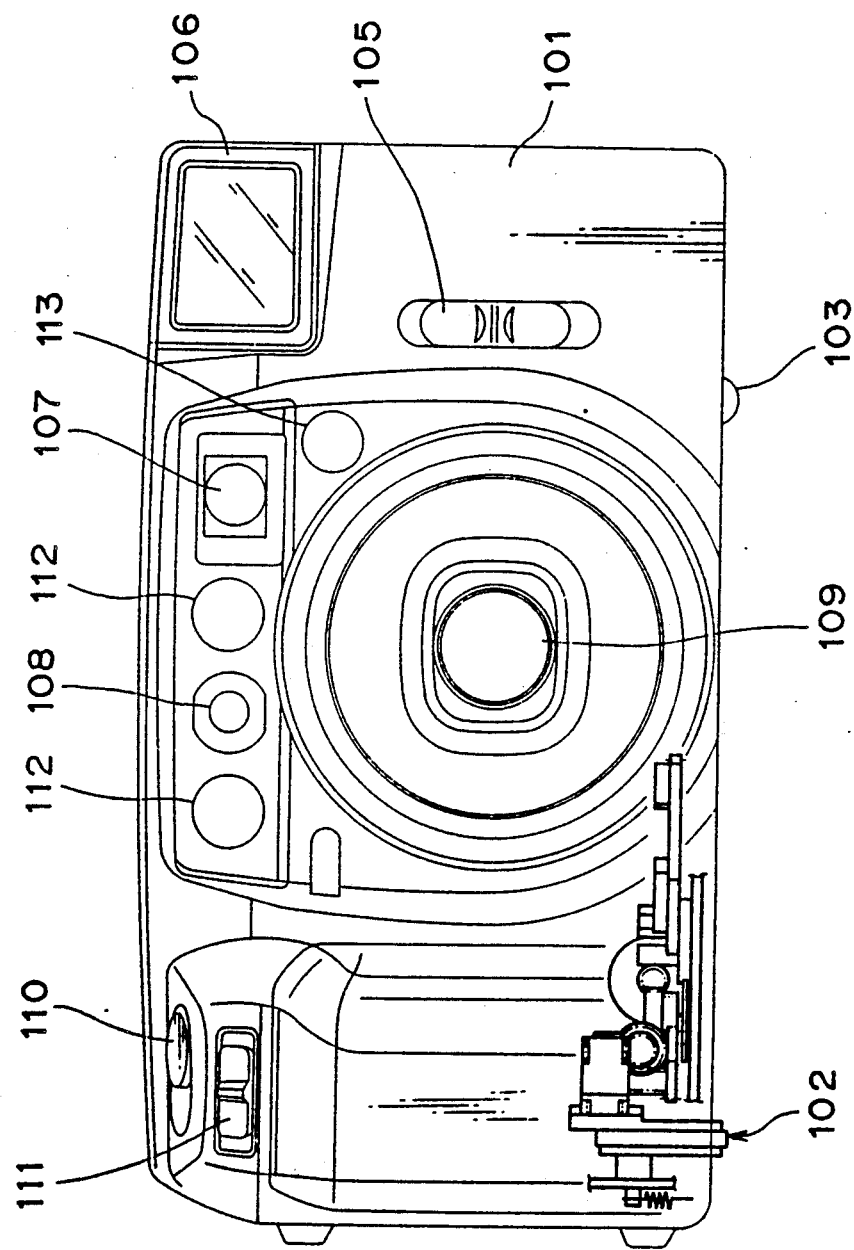
FIGS. 1, 2 and 3 are a front elevational view, a right side view and a top plan view, respectively showing a camera having a planetary gearing according to one preferred embodiment of the present invention.

Before the description of the present invention proceeds, it is to be noted that like parts are designated by like reference numerals throughout the accompanying drawings.

Figure 2:
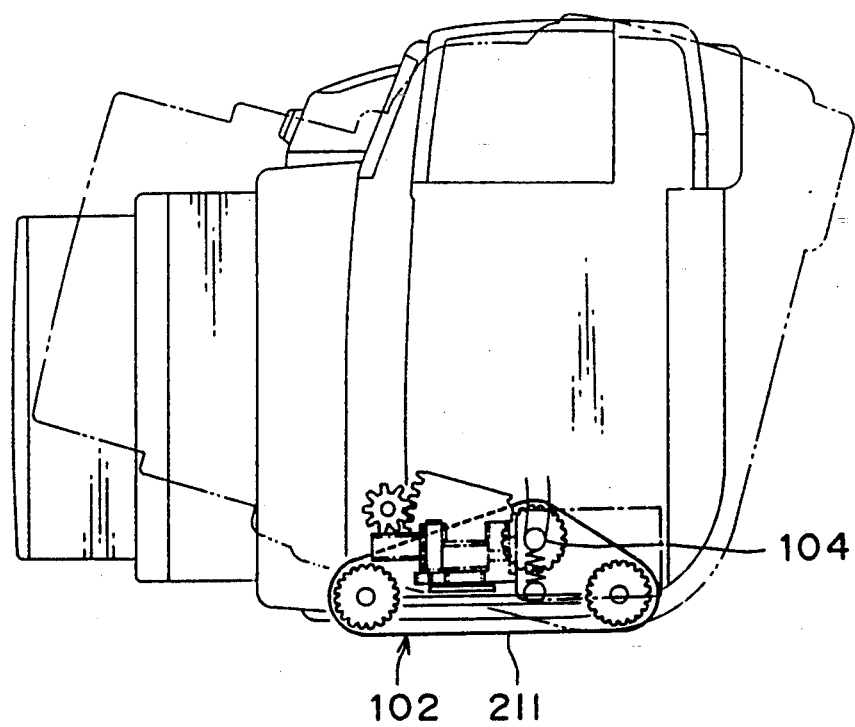
Figure 3:
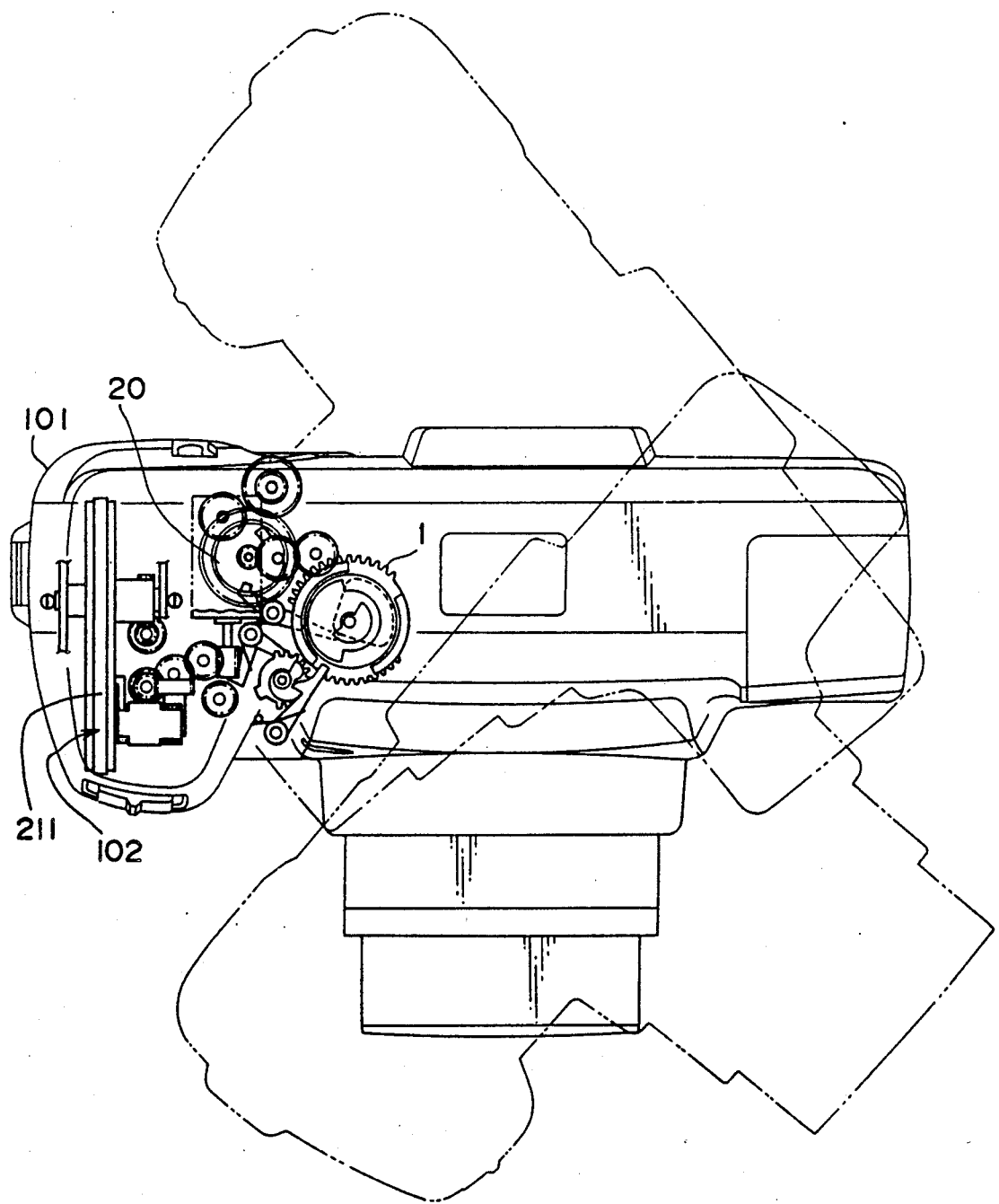

Referring first to FIGS. 1, 2 and 3, a power switch button is indicated by a reference numeral 105. The switch button 105 located, in FIG. 1, at the neutral position, i.e. the OFF position, may be shifted upwardly and downwardly toward a first ON position for a normal photographing mode and a second ON position for a flash-photographing mode. In the figures, 106 denotes a flash device, 107 viewfinder, 108 light measuring window, 109 a photographing lens, 110 a shutter release button, 111 a zoom switch button, and 112 a distance measuring light projecting and receiving windows.

As shown in FIGS. 2 and 3 illustrating the operation of the camera 101, its body is pivotable around a horizontal axis and also around a vertical axis with respect to a support members (not shown). The camera is provided with a drive means for rotating the body, which includes a crawler 102. The crawler 102 has a shaft 104 parallel to a bottom plane of the camera body and rectangular to an optical axis, and a crawler shoe 211 to turn around the shaft 104 with a bottom part thereof projecting downwardly out of the bottom plane. When the crawler shoe 211 turns around the shaft 104, the camera 101 may pivot in a horizontal plane at a fulcrum member 103, as apparent from the later description. Furthermore, the drive means includes a drive mechanism for rotating the camera in a vertical plane by relatively rotating the crawler 102 around the shaft 104. According to this camera 101, the pivotal movements of the camera body in the horizontal and vertical directions, zooming operation and shutter release operation can be effected by a remote controller (not shown), respectively. Therefore, the camera 101 is provided with a window 113 for receiving the signals emitted from the remote controller, which is located adjacent to the photographing lens 109.

Further, the drive means also includes a mechanism for performing a zooming operation in addition to the horizontally and vertically pivotal movements.

Figure 4:
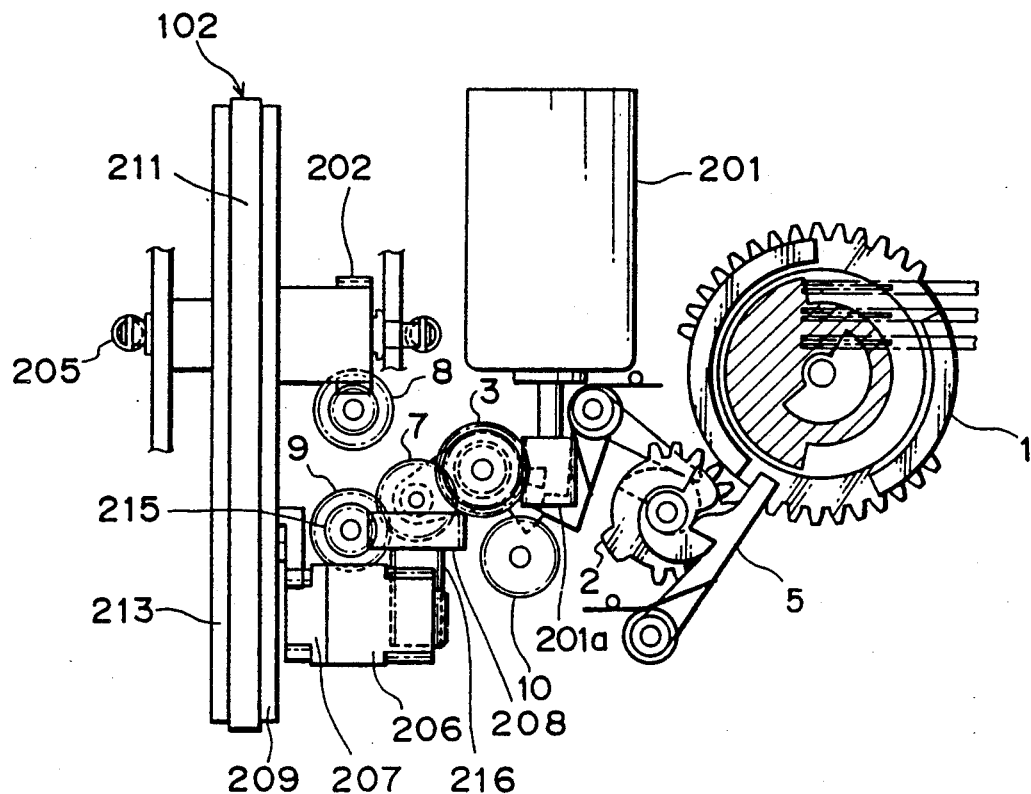
FIGS. 4, 5 and 6 are a top plan view, a front elevational view and a left side view of a drive means included in the camera in FIGS. 1, 2 and 3, respectively.
Figure 5:
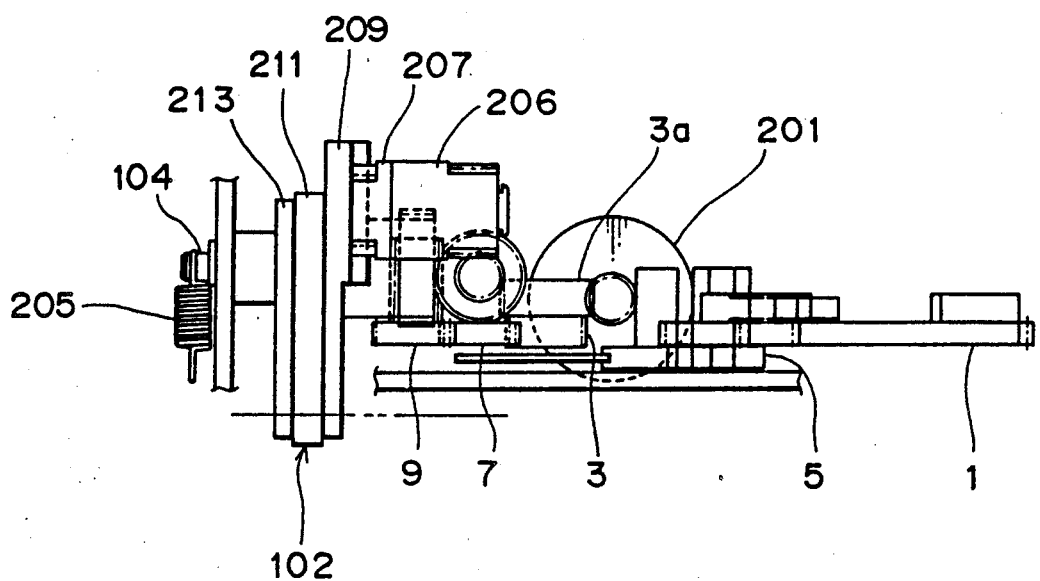
Figure 6:
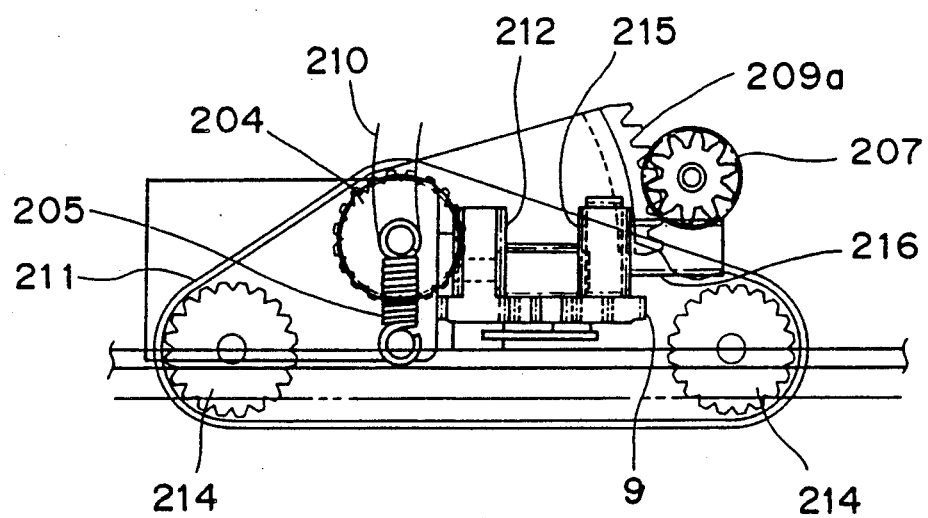

The drive means for zoom operation is described hereafter by making reference to FIGS. 4-6.

FIGS. 4, 5 and 6 are, respectively, a top plan view, front elevational view and left side elevational view of the drive means. The drive means includes a first cam-gear 1 as a first control means which is driven by a film winding motor 20 (FIG. 3), and a zoom motor 201 for effecting the horizontally and vertically pivotal movements of the camera and the zooming operation of the photographing lens. An output shaft of the motor 201 is provided with a worm 201a which is engaged with a gear 3a. A sun gear 3 is mounted on a shaft so as to be co-axial with the gear 3a. A planetary gear 7 is engaged with the sun gear 3 to constitute a planetary gearing. The power is selectively transmitted via the planetary gearing to a horizontally pivotal movement gear 8, a vertically pivotal movement gear 9 and a zoom gear 10.

Figure 20A:
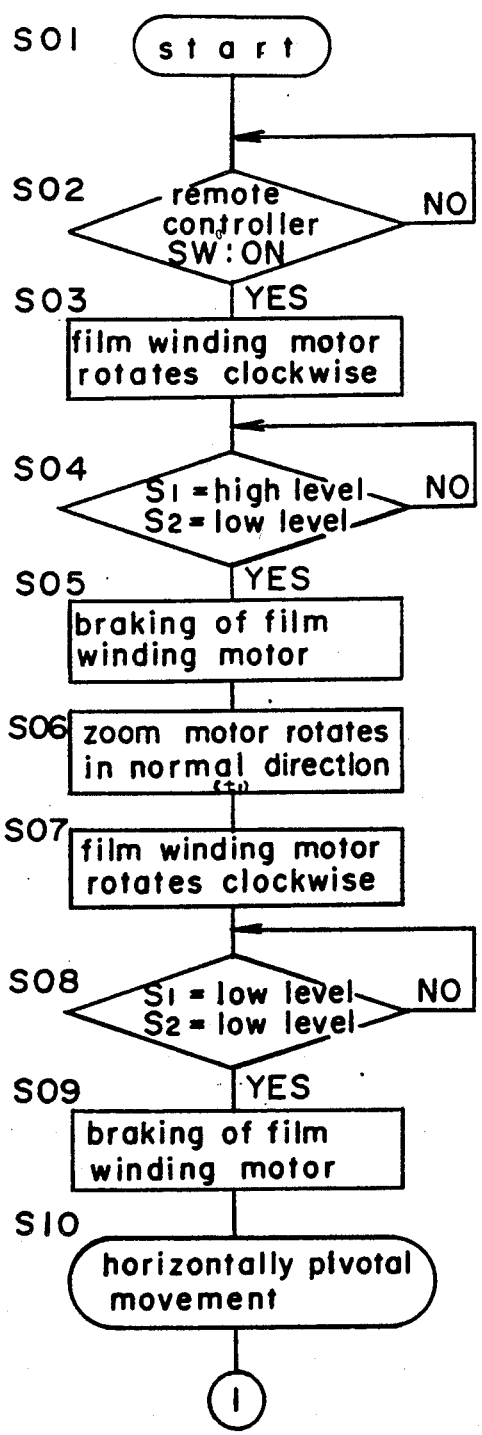
FIGS. 20A, 20B, 20C, 21 and 22 are flowcharts, respectively showing the operation of the camera.
Figure 20B:
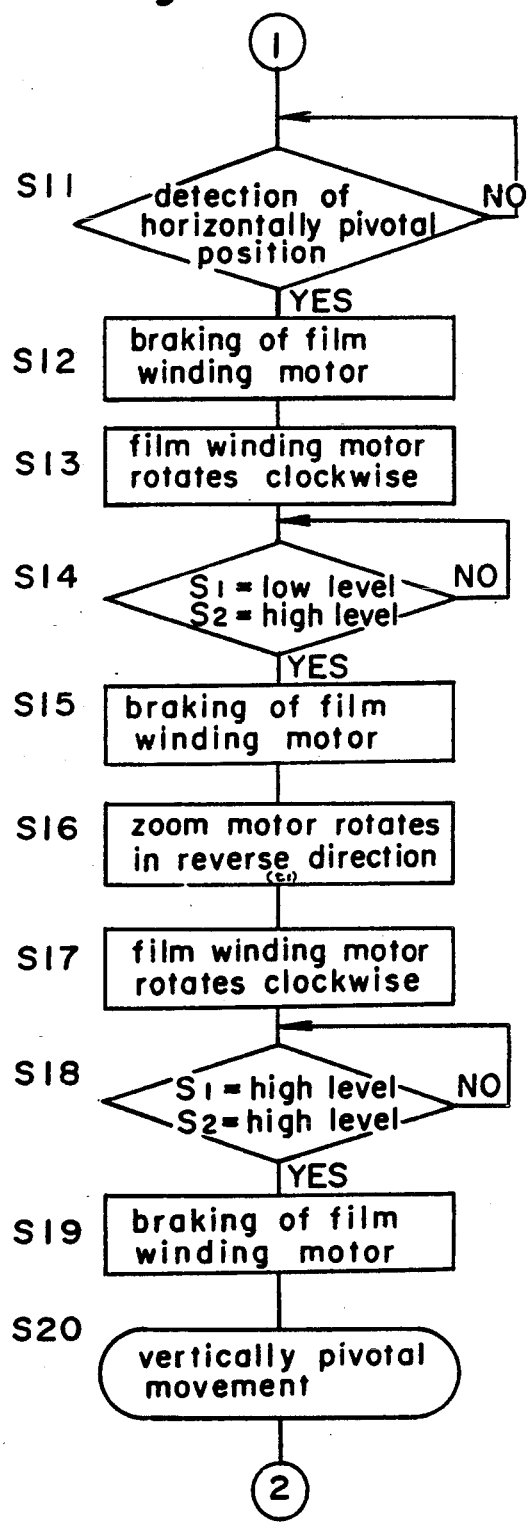
Figure 20C:
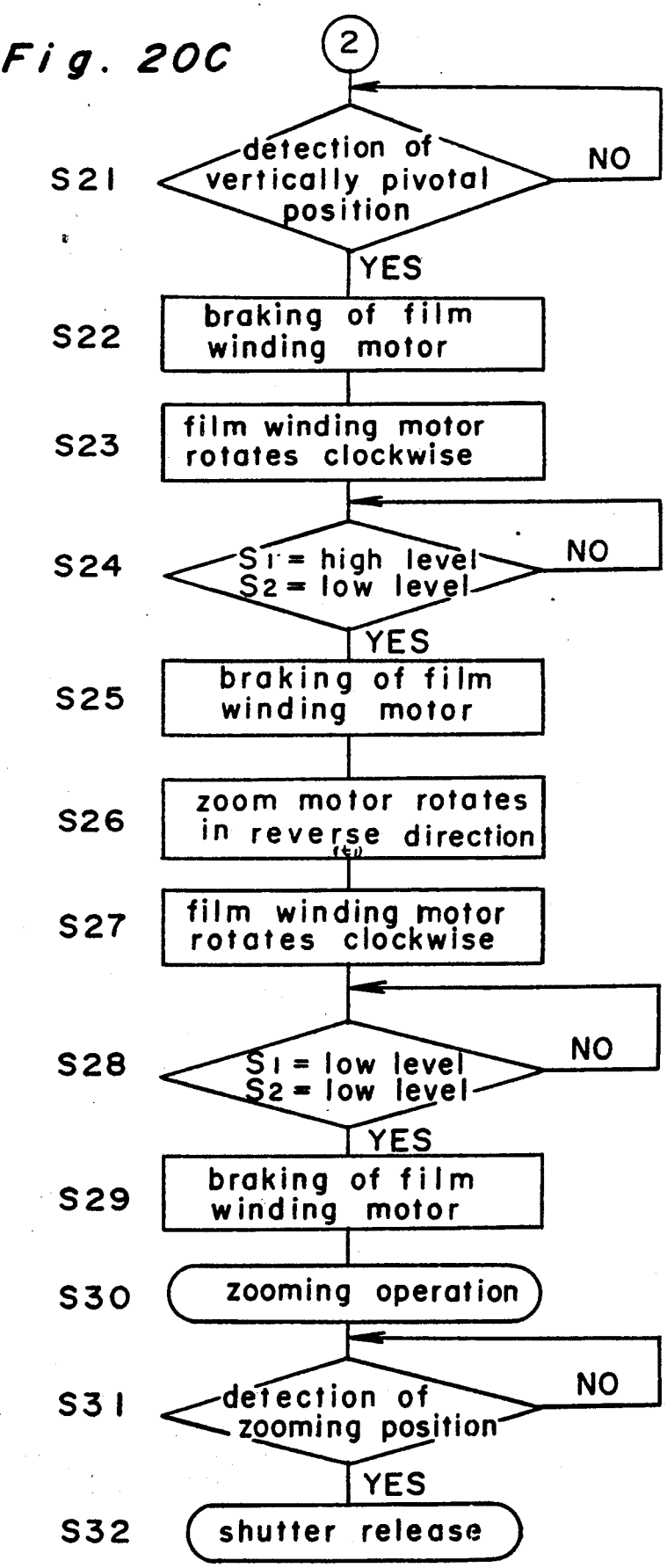

The detailed description as to the drive means including the planetary gearing will be made by making reference to FIG. 7. And subsequently the operation of the drive means will be described in detail based on FIGS. 8-14 illustrating its operation and FIGS. 20A, 20B and 20C illustrating the flowchart of the operation.

Figure 7:
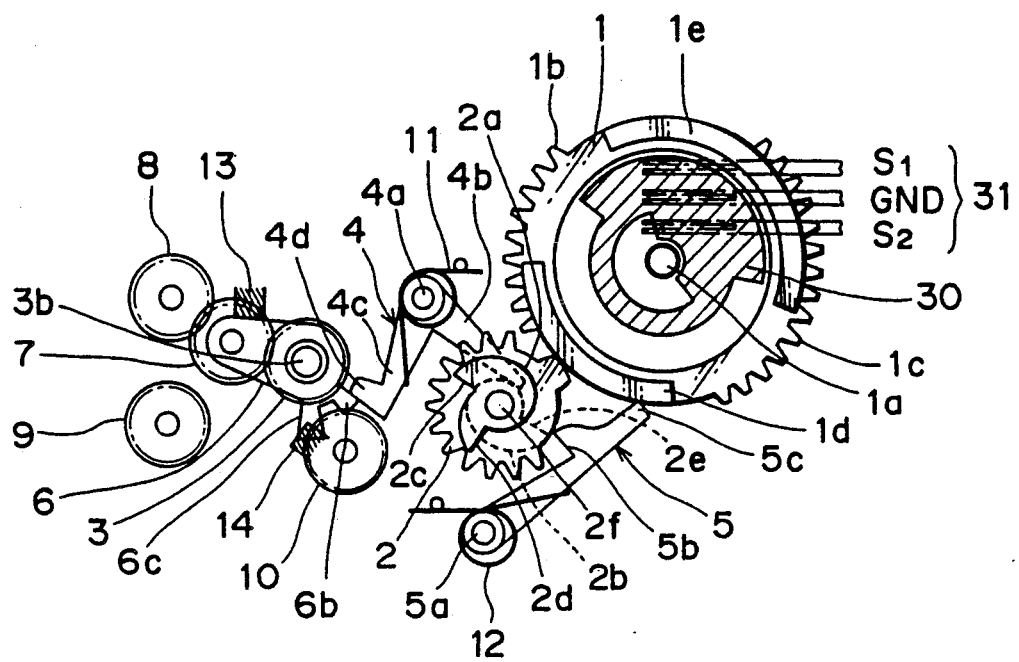
FIGS. 7-16 are top plan views, respectively showing the arrangement and operation of the planetary gearing.

Referring to FIG. 7, the first cam-gear 1 comprises a gear member having a first gear section 1b and a second gear section 1c, and a pair of walls 1d and 1e which are formed on a upper face of the gear member. The cam-gear 1 is supported rotatably by a first shaft 1a which extends from the body of the camera. The rotational position of the cam-gear 1 detected by an encoder which has a rotational substrate 30 mounted on the cam-gear 1 and has an encoder pattern, and a fixed substrate 31 including contacts or terminals S1 and S2 and an earth terminal GND.

A second cam-gear 2 as a second control means is supported by a second shaft 2f so as to engage the first cam-gear 1. The second cam-gear 2 comprises an upper cam 2a and lower cam 2b. The upper cam 2a has a pair of engagement faces 2c and 2d, while the lower cam 2b has a single engagement face 2e. FIG. 7 indicates a state such that the second cam-gear 2 is located at a first stop position. The second cam-gear 2 is urged by an unshown spring to rotate counterclockwise around the second shaft 2f toward the first stop position shown.

A third shaft 5a is arranged adjacent to the second shaft 2f, which supports rotatably one end of a lever 5. The lever 5 is urged by a spring 12 to rotate counterclockwise around the third shaft 5a and has a claw 5b to be engaged with the engagement faces 2c and 2d of the cam 2a, and a head 5c to be in contact with the outer surface of the walls 1d and 1e of the first cam-gear 1.

A forth shaft 4a is arranged adjacent to the second shaft remote from the third shaft 5a, which supports rotatably a V-shaped lock lever 4 having a pair of arms 4b and 4c. The lever 4 is urged by a spring 11 to rotate clockwise around the forth shaft 4a. The sun gear 3 is rotatably supported by a fifth shaft 3b. The planetary gear 7 is supported by a planetary carrier 6 rotatable around the sun gear 3 so as to be shiftable in accordance with the rotation of the sun gear 3. The carrier 6 has a pair of engagement projections 6b and 6c which are engageable with a claw 4d formed on the end of the arm 4c of the lever 4 and engageable with a pair of stoppers 13 and 14 projecting from the body of the camera so that the the carrier 6 is held at the predetermined positions. FIG. 7 also illustrates the gears 8, 9 and 10 as previously described.

In FIG. 7, the planetary gear 7 is engaged with the horizontally pivotal gear 8 to rotate the camera 101 at the fulcrum member 103 by turning the crawler shoe 211 of the crawler 102. This state will be described in detail later. Describing briefly here, this state corresponds to a waiting state between steps S09 and S10 in FIG. 20A. Since the carrier 6 is engaged with the stopper 13 and the projection 6b is engaged with the claw 4d of the lock lever 4, the torque outputted from the zoom motor 201 (FIG. 4) is transmitted to the crawler 102 via the gear 8 so that the camera may pivot along the horizontal plane (step S10 in FIG. 20A).

Figure 8:
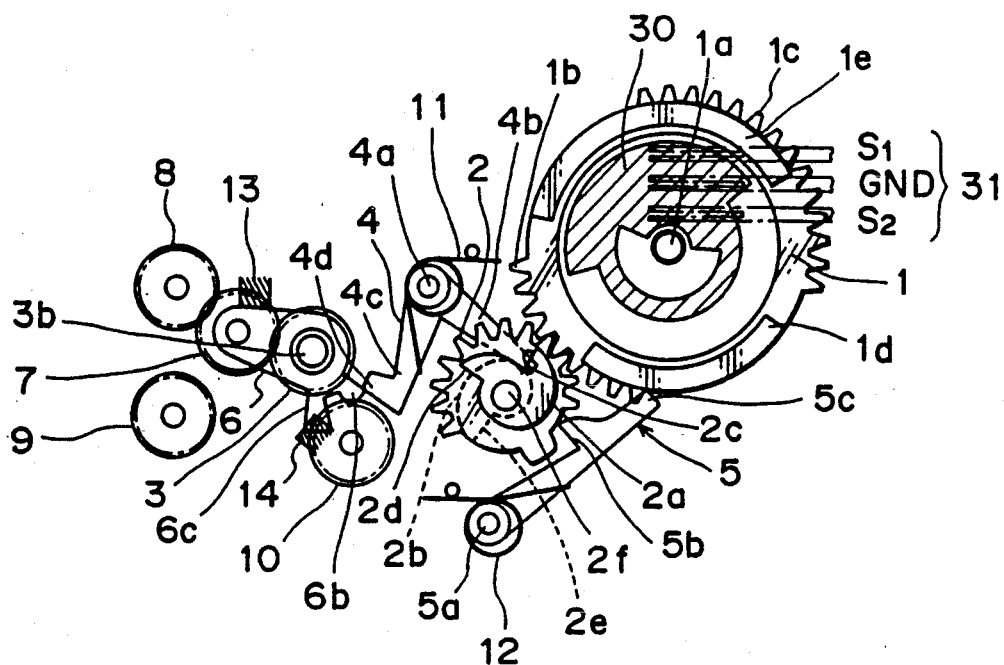

When a signal for vertically pivotal movement of the camera is emitted from the remote controller after the skipping of the performance of the horizontally pivotal movement of the camera or after it is detected that the camera has pivoted along the horizontal plane and reached the predetermined horizontal position, the zoom motor 201 is stopped and the film winding motor 20 is rotated clockwise (step S11-13), resulting in the counterclockwise rotation of the first cam-gear 1. Accordingly, the second cam-gear 2 is rotated clockwise by the gear section 1b, so that the lever 4 is rotated counterclockwise by the cam 2b against the urging of the spring 11, resulting in that the claw 4d is gradually disengaged from the projection 6b of the carrier 6, as shown in FIG. 8.

Figure 9:
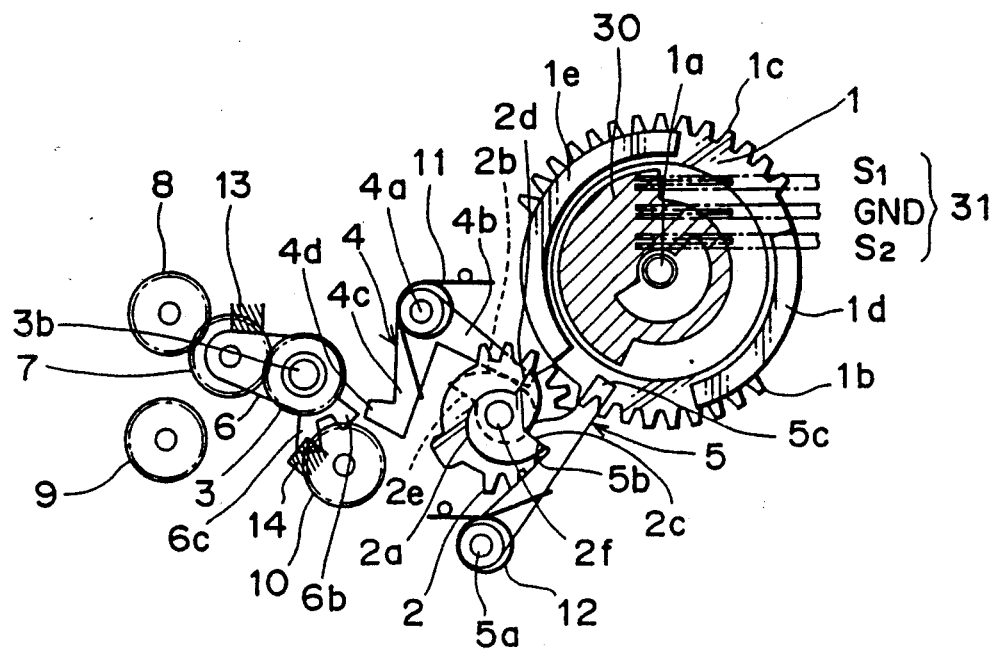
Figure 10:
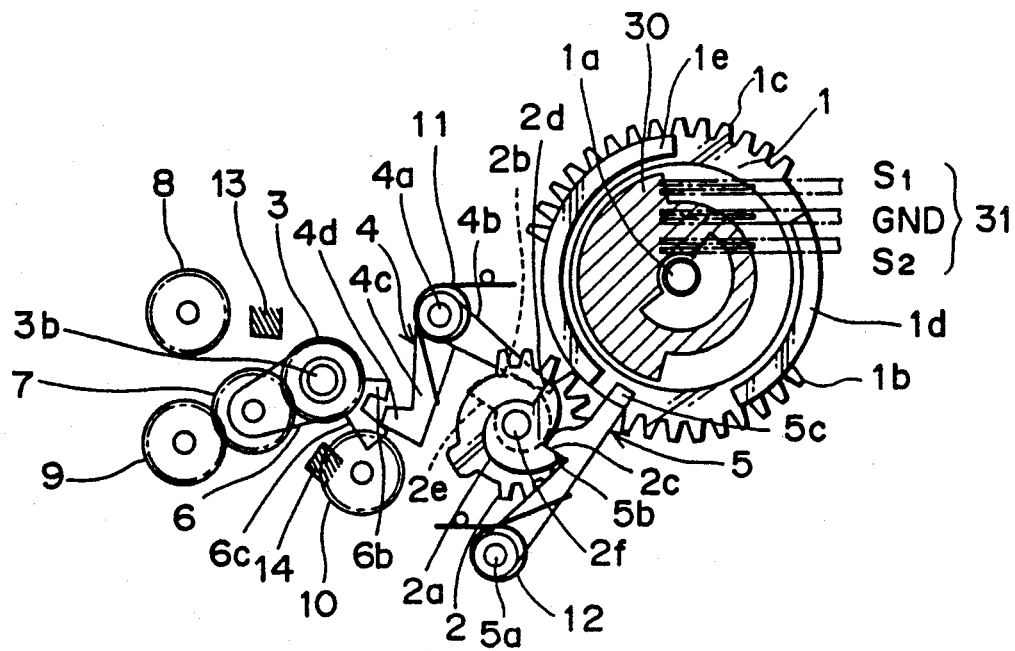
Figure 11:
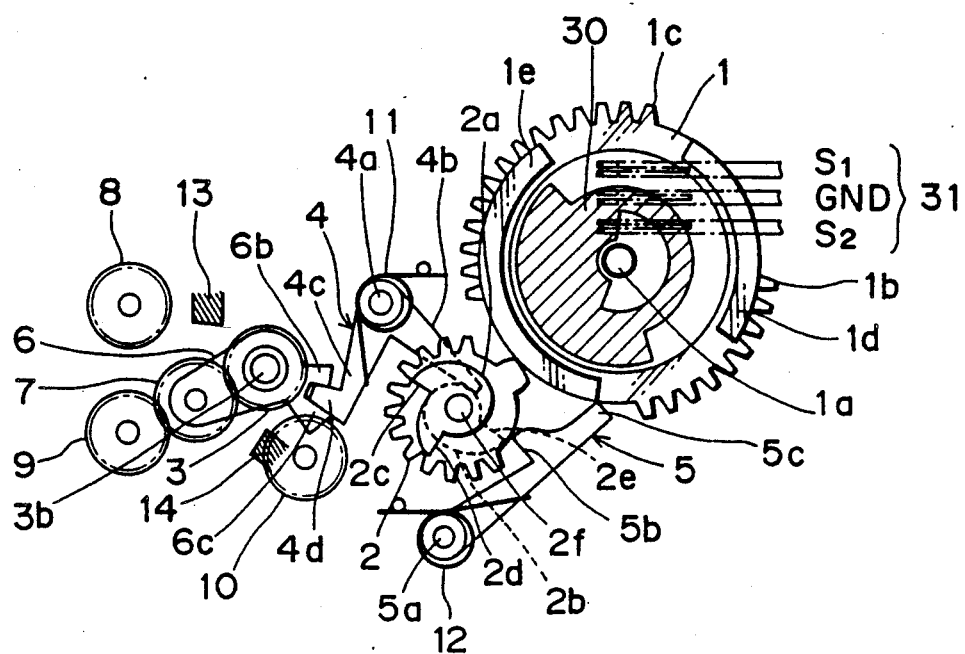
Figure 12:
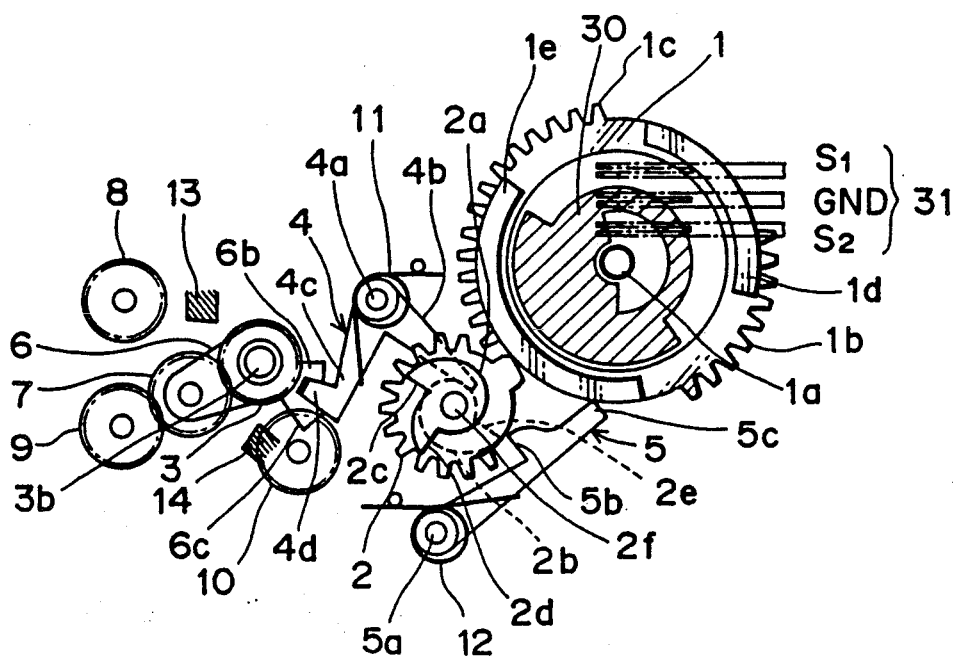

Next, as shown in FIG. 9, when the first cam-gear 1 is counterclockwise rotated further, the head 5c of the lever 5 is disengaged from the wall 1d so that the lever 5 is rotated counterclockwise by the spring 12, resulting that the claw 5b comes in contact with the peripheral surface of the cam 2a. When the rotation of the first cam-gear 1 progresses further, the gear section 1b is disengaged from the second cam-gear 2 and the engagement face 2c of the cam 2a, which is urged by the unshown spring to rotate counterclockwise, is simultaneously engaged with the claw 5b of the lever 5, so that the cam-gear 2 is stopped at a second stop position shown in FIG. 9. Before the second cam-gear 2 reaches the second stop position, the claw 4d of the lever 4 is disengaged from the projection 6b of the carrier 6 because the arm 4b is rotated counterclockwise by the cam 2b, resulting that the carrier 6 is rotatable counterclockwise together with the planetary gear 7. At this time, the encoder outputs a low level signal from the terminal S1 and a high level signal from the terminal S2 (step S14) so that the film winding motor 20 is braked, resulting that the rotation of the first cam-gear 1 is stopped (step S15). After step S15, the zoom motor 201 is rotated in a reverse direction for a predetermined time t1 (step S16) so that the carrier 6 is rotated counterclockwise together with the planetary gear 7 until the planetary gear 7 is engaged with the vertically pivotal gear 9. Their engagement is ensured by the engagement of the projection 6c and the claw 4d of the lever 5, as shown in FIG. 10. Further, as shown in FIG. 11, the film winding motor 20 is rotated clockwise (step S17) so that the first cam-gear 1 is rotated counterclockwise. Accordingly, the head 5c of the lever 5 is depressed by the wall 1e of the first cam-gear 1 so that the lever 5 is rotated clockwise, resulting that the claw 5b is disengaged from the engagement face 2c of the cam 2a. Thus, as shown in FIG. 11, the second cam-gear 2 return to the first stop position. Thus, the lever 4 is slightly rotated clockwise so that the claw 4d fits in the space or recess between the projections 6b and 6c, resulting that the position of the planetary gear 7 for the vertical pivotal movement is fixed. When the signals outputted from both terminals S1 and S2 become high level, respectively (step S18), the film winding motor 20 is braked (step S19) so that the state shown in FIG. 12 appears. Accordingly, the vertically pivotal movement of the camera can be effected by driving the zoom motor 201 (step S20).

Figure 13:
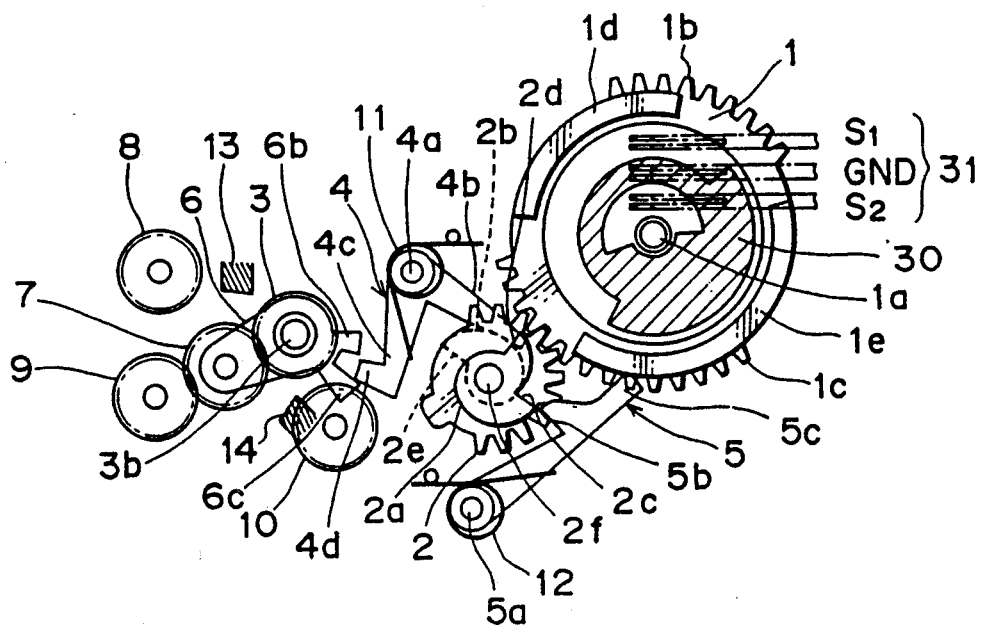
Figure 14:
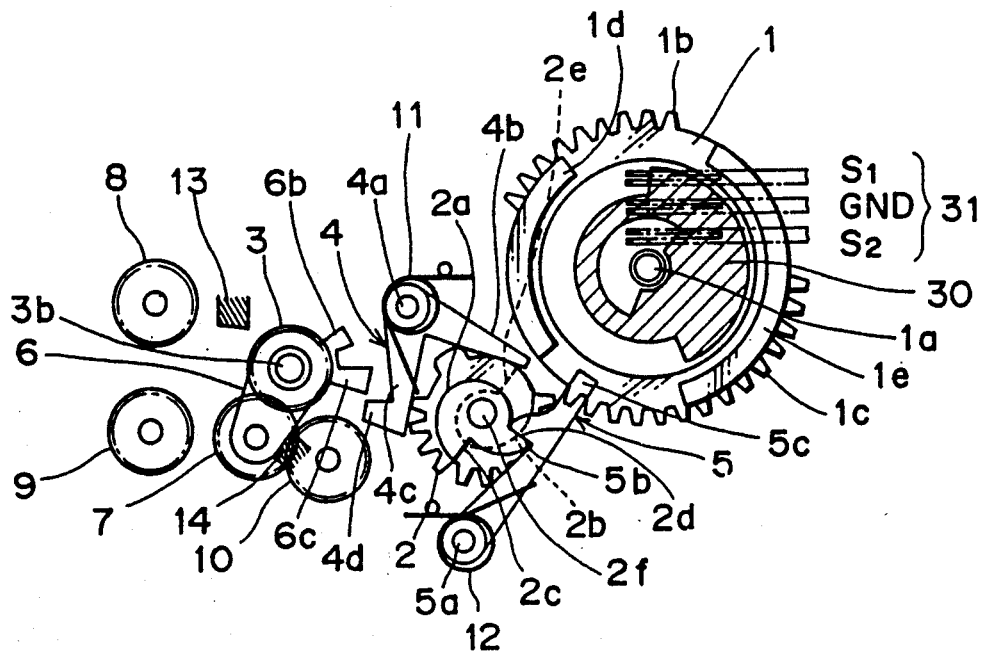
Figure 15:
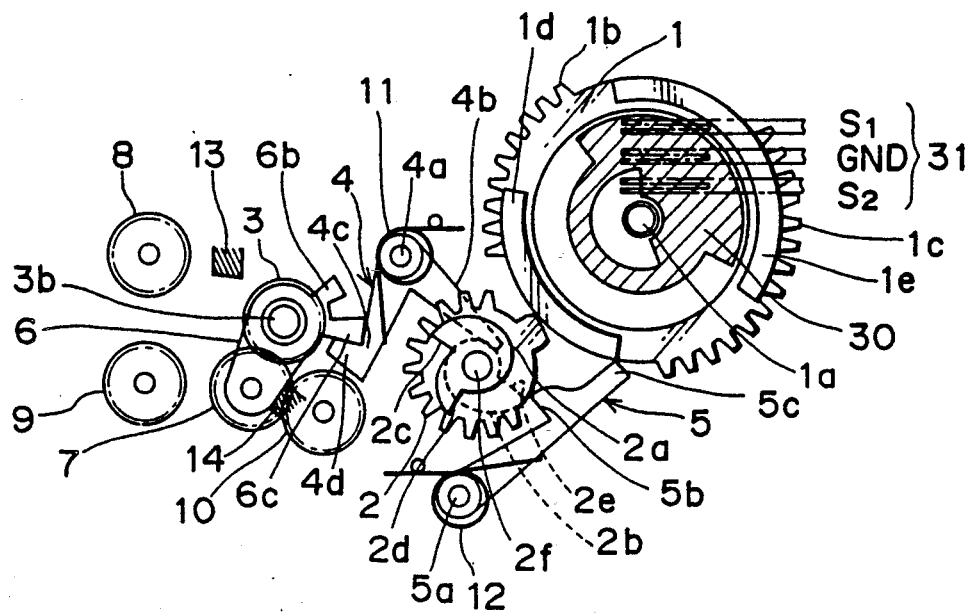

When a zooming signal is emitted after it is detected that the vertically pivotal movement of the camera has been effected at step S20 or when the same movement has been skipped, the film winding motor 20 is rotated clockwise with the zoom motor 201 braked (steps S21-23). Accordingly, the first cam-gear 1 is rotated counterclockwise, while the second cam-gear 2 is rotated clockwise by the engagement thereof with the gear section 1c of the first cam-gear 1 (FIG. 13). It is noted that the range of the gear section 1c is larger than that of the gear section 1b. Therefore, the rotational angle of the second cam-gear 2 is larger so that the second cam-gear 2 is stopped at the second stop position shown in FIG. 14 by engagement of the claw 5b and the engagement face 2d. At this time, since the rotational position of the lever 4 is right, in FIG. 14, with respect to that as shown in FIG. 9, the claw 4d of the lever 4 permits the rotation of the carrier 6. And, when the signal emitted from the terminal S1 becomes low level and the signal emitted from the terminal S2 becomes high level (step S24), the film winding motor 20 is stopped (step S25) so that the first cam-gear 1 is stopped.

Figure 16:
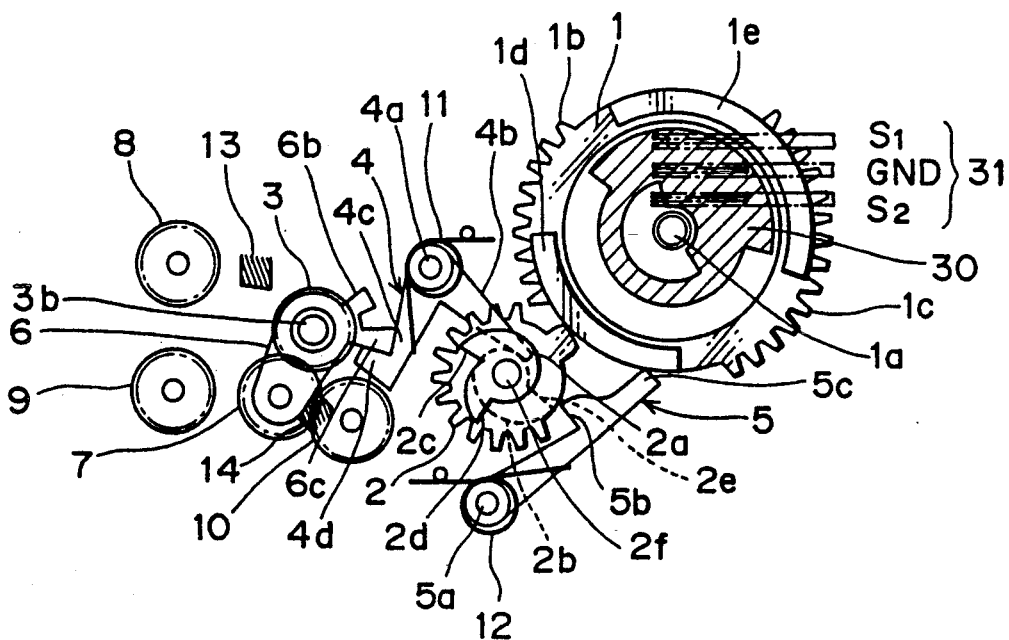

Next, when the zoom motor 201 is rotated in a reversal direction for a predetermined time t1 (step S26), the carrier 6 is rotated counterclockwise until the carrier 6 is stopped by the stopper 14 and the planetary gear 7 is simultaneously engaged with the zooming operation gear 10. Subsequently, the film winding motor 20 is rotated again counterclockwise (step S27), so that the lever 5 is rotated clockwise by the engagement of the wall 1d and the head 5c. Accordingly, the claw 5b is disengaged from the engagement face 2d of the cam 2a, as shown in FIG. 16, so that the cam-gear 2 is instantaneously rotated counterclockwise to the first stop position as shown in FIG. 7, by the unshown spring. Consequently, the claw 4d of the lever 4 is engaged with the projection 6c of the carrier 6, resulting that the carrier 6 is fixedly positioned as shown in FIG. 16. At this time both terminals S1 and S2 emit the low signals (step S28), so that the film winding motor 20 is braked (step S29), accordingly, the first cam-gear 1 is stopped at a position as shown in FIG. 16. In this condition the zooming operation is effected by driving the zoom motor 201 and subsequently the shutter release button may be depressed (steps S30-32).

In order to effect immediately the zooming operation for the normal photographing, the gears and the levers are usually located in the positions as shown in FIG. 16. And, when the horizontally pivotal movement of the camera is intended, the following switching operation of the gears is performed;

First, when the switch mounted on the remote controller is turned on (step S02), the film winding motor 20 is rotated clockwise to rotate the first cam-gear 1 until the terminal S1 emits a high level signal and the terminal S2 emits a low level signal, that is, until the claw 4d is disengaged from the projection 6c after the the gear section 1b has passed and the gear section 1c has been engaged to rotate the second cam-gear 2 (steps S03-05). Subsequently, the zoom motor 201 is rotated in a normal direction for the predetermined time t1 until the carrier 6 becomes in contact with the stopper 13 (step S06). Next, the film winding motor 20 is rotated clockwise again (step S07), so that the claw 5b of the lever is disengaged from the engagement face 2d of the cam 2a. Consequently, the second cam-gear 2 is rotated counterclockwise to the first stop position by the unshown spring, resulting that the carrier 6 is positioned at a position as shown in FIG. 7, by the engagement of the claw 4d and the projection 6b. At this time, the encoder outputs the low level signals from both the terminals S1 and S2 (step S08), so that the film winding motor 20 is stopped (step S09). When the zoom motor is driven under this condition, the horizontally pivotal movement of the camera will start (step S10).

As apparent from the foregoing description, according to this embodiment, when the remote control photographing is available, the operation based on the flowchart as shown in FIGS. 20 A, B and C is carried out so that the operation state is switched, in turn, from the zooming operation state to the horizontally pivotal movement state and the vertically pivotal movement state. As previously described, any of the horizontally pivotal movement, the vertical pivotal movement and zooming of the camera may be skipped. In this case, in the flowchart shown in FIGS. 20A, B and C the program advances from step S22 to step S02 or from step S31 to step S12.

As described above, despite one motor is able to drive three loads, a specialized stopper for stopping the planetary gear at the intermediate stop position and own detectors for detecting the position of the planetary gear is not required. Thus, considerably complicated operation as described above can be controlled by less number of control members.

Next, returning to FIGS. 4-6, an embodiment of the mechanism for effecting the horizontally and vertically pivotal movements of the camera is described below in detail.

As previously described, the crawler 102 is supported by the shaft 104 which is urged downwardly by a spring 205 along the grooves 210 formed in the body. A gear 204 for the crawler shoe 211 and a worm wheel 202 are respectively mounted on the shaft 104. The worm wheel 202 is engaged with a worm 212 formed integrally with the gear 8 for the horizontally pivotal movement of the camera. The transmission of the power from the worm wheel 202 to the gear 204 is effected by a frictional transmission device which permits a skidding of the worm wheel 202 when an overload is applied. Furthermore, a pair of triangular plates 209 and 213 are arranged at both sides of the crawler shoe 211 and rotatably supported, at the upper corner, by the shaft 104. Each of the remaining corners of the plates 209 and 213 is provided with a driven gear 214.

The rotation of the gear 9 for the vertically pivotal movement of the camera is transmitted to a driven gear 209a, which is formed on one plate 209 and the center of which corresponds to the shaft 104, through worm 215 formed integrally with the gear 9, an intermediate gear 208, worm 216, worm wheel 206, a frictional transmission device, and a driven gear 207. With the above-described arrangement, when the planetary gear 7 is engaged, as shown in FIG. 4, with the gear 9 for the vertically pivotal movement of the camera, the entire crawler 102 will pivots in a vertical plane around the shaft 104 provided that the zoom motor 201 is driven. Namely, the camera body is tilted, as shown in FIG. 2, with respect to the crawler 102 which is function as a support of the camera body.

On the contrary, in the case where the planetary gear 7 is engaged with the gear 8 for the horizontally pivotal movement of the camera, the crawler shoe 211 turns around the shaft 104 in accordance of the driving of the zoom motor 201 so that the camera 101 rotates around the fulcrum member 103, as shown in FIG. 3. Furthermore, when the planetary gear 7 is engaged with the gear 10 for the zooming operation, the power of the zoom motor 201 is transmitted to a drive means for moving the photographing lens and the like, so that the zooming operation can be carried out.

According to the above arrangement, since the lower part of the crawler 102 is located below the bottom of the body, the lower part of the crawler is exposed to the external force. However, even when the external force is applied to the camera body or the crawler 102, the frictional transmission devices arranged between the gear 204 and worm wheel 202 and between worm wheel 206 and gear 207 absorb, respectively, the external force so that the camera body may pivot in the vertical or horizontal plane, and also the spring 205 may absorb the external force by deforming to permit the crawler 102 to be depressed into the camera body, resulting that the damage of the crawler 102 and the driving mechanism thereof is avoidable.

Figure 17:
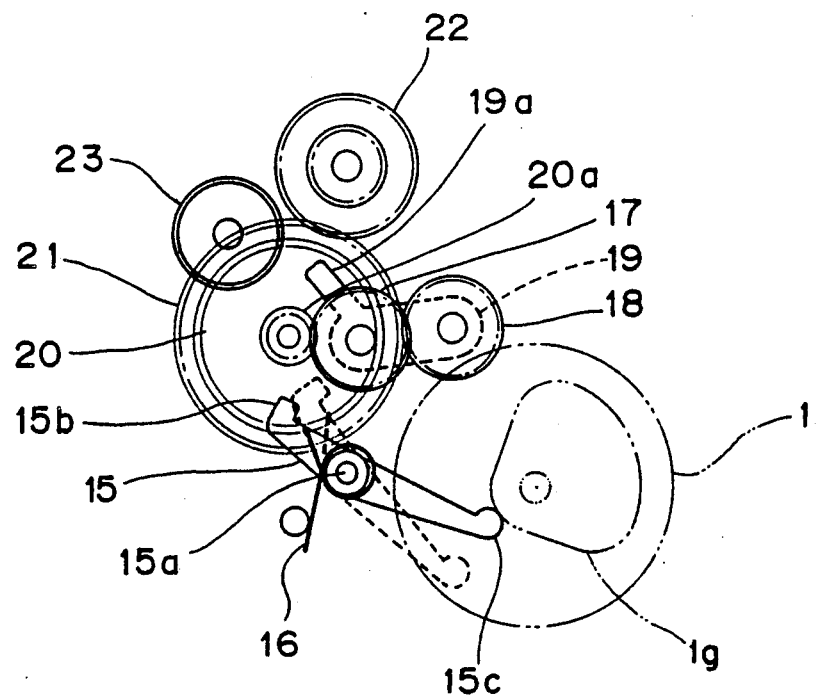
FIGS. 17-19 are top plan views, respectively showing the arrangement and operation of a mechanism for transmitting a power of a film winding motor, which is included in the camera in FIGS. 1-3.
Figure 18:
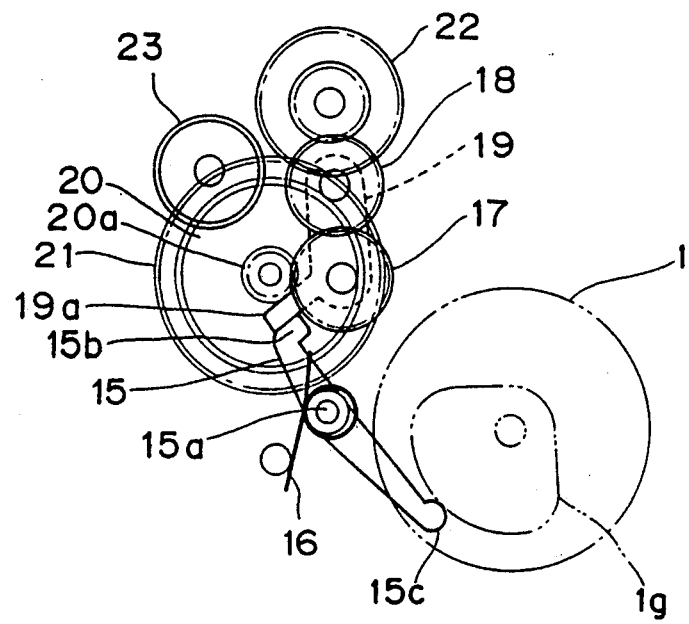
Figure 19:
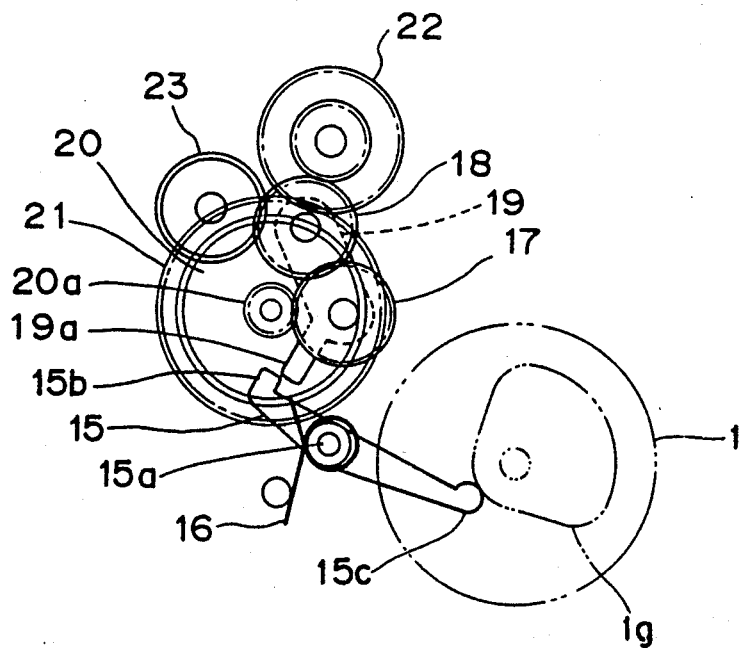
Figure 21:
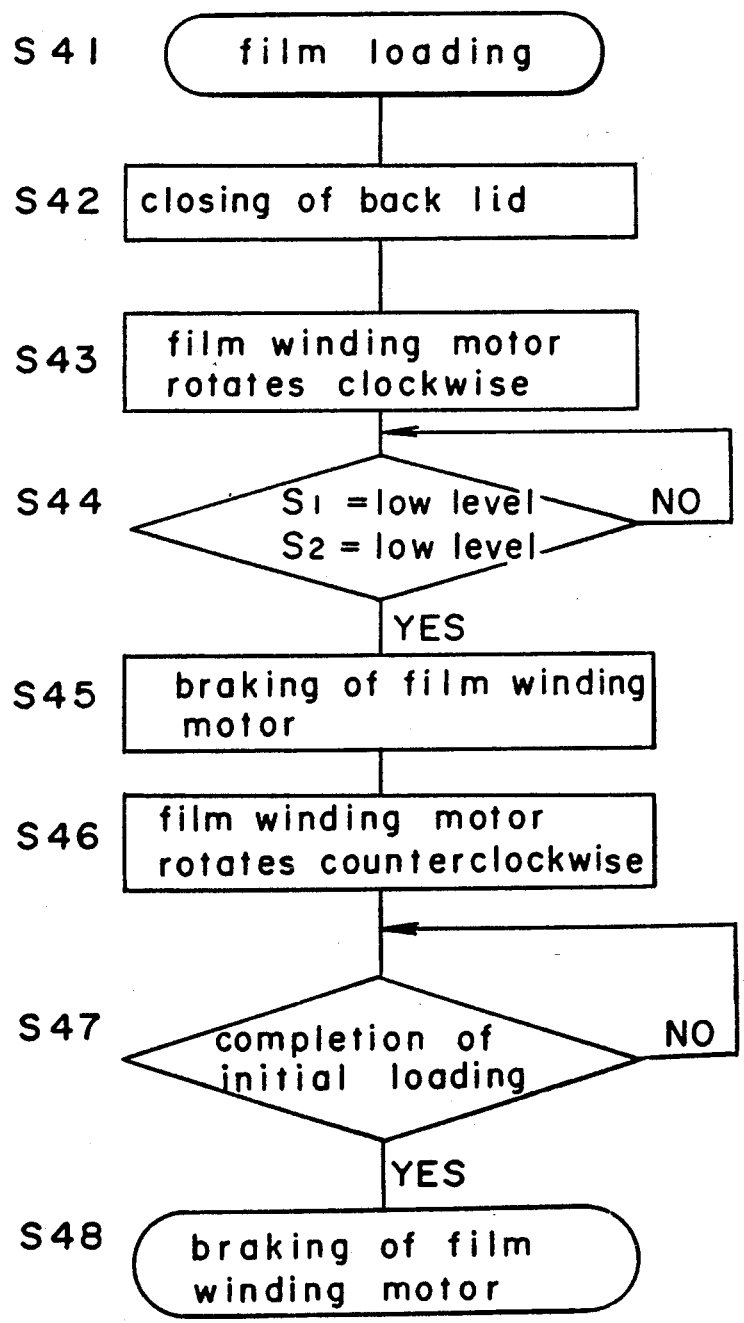
Figure 22:
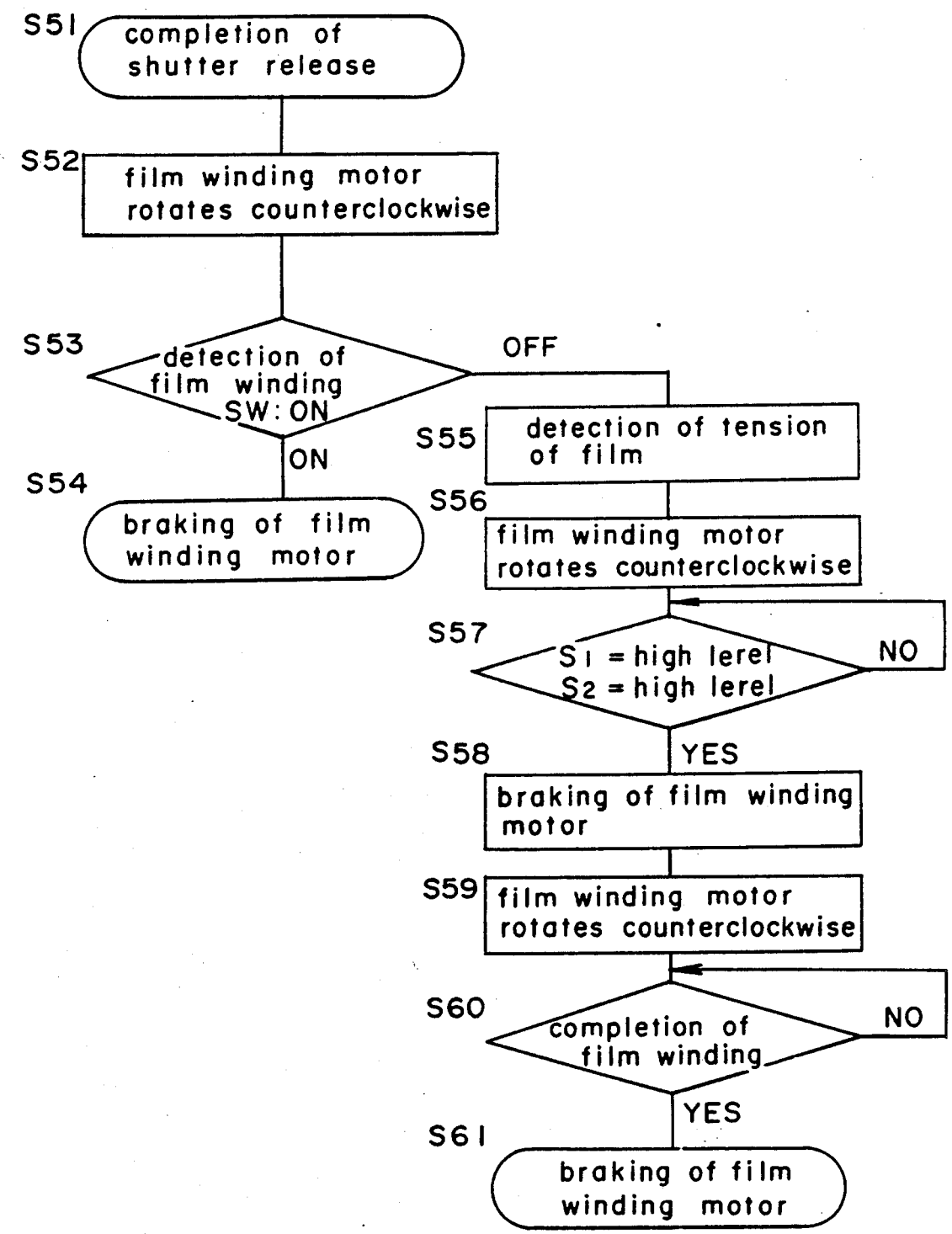

Next, the transmission of the power from the film winding motor 20 to the first cam-gear 1 and winding-rewinding gear is described below by making reference to FIGS. 17-19 illustrating the operation thereof, FIGS. 21 and 22 illustrating the flowchart of the operation thereof. It is noted that FIGS. 17-19 are drawings viewed from the rear side of FIGS. 7-16.

The film winding motor 20 is accommodated in a spool 21 arranged above the first cam-gear 1, as shown in the figures. A gear 20a is mounted on an output shaft of the motor 20. The sun gear 17 is engaged with the gear 20a, and a film winding planetary gear 18 engaging the sun gear 17 is supported by a planetary carrier 19 so as to be rotatable around the sun gear 17. Furthermore, a film winding transmission gear 22 formed on the spool 21 and a film rewinding transmission gear 23 are arranged adjacent to the sun gear 17. Still further, the first cam-gear 1 is provided with a cam 1g which is rotatable together with the cam-gear 1. A lock lever 15 is arranged adjacent to the spool 21 and the first cam-gear 1, supported rotatably by a shaft 15a and urged by a spring 16 so as to rotate counterclockwise. The lever 15 has, at one end, an engagement end 15c to follow the cam 1g, and, at the other end, a claw 15b for positioning the planetary gear 18 at a predetermined position.

In FIG. 17, the counterclockwise rotation of the motor 20 is transmitted to the cam-gear 1 through the gear 20a, the sun gear 17, the planetary gear 18 and a gear 1f, so that the cam-gear 1 is rotated clockwise. Thus, as described according to FIGS. 7-16, the switching operation between the horizontally pivotal movement, the vertically pivotal movement and the zooming of the photographing lens can be performed.

Referring to FIG. 18 illustrating a film winding operation, the cam-gear 1 in the state of FIG. 17 is rotated counterclockwise until the encoder emits the low signals from both terminals S1 and S2. Namely, the cam-gear 1 rotates until the rotation of the carrier 19 is stopped by the engagement of the claw 15b and a engagement projection 19a of the carrier 19 which is caused by the clockwise rotation of the lock lever 15 due to the rotation of the cam 1g. Subsequently, when the motor 20 is rotated clockwise, the planetary carrier 19 rotates counterclockwise so that the planetary gear 18 is disengaged from the cam-gear 1. And, when the projection 19a engages the claw 15b so that the movement of the carrier 19 is stopped, the planetary gear 18 is engaged with the transmission gear 22. The power of the motor 20 is, thereafter, transmitted to the spool 21 through the gear 20a, the sun gear 17, the planetary gear 18 and the film winding gear 22, so that the film winding is effected. After the film loading (step S41 in FIG. 21), when a back lid of the camera is closed (step S42), the film winding motor 20 is rotated (step S43) until the encoder emits the low signals from both the terminals S1 and S2 (steps S44). Subsequently, the motor 20 is rotated counterclockwise until the initial film loading is completed (steps S46–48).

Referring to FIG. 19 and 22 showing a film rewinding operation, this operation is carried out when the film winding is not completed in spite of the completion of the shutter release and the film cartridge has no more film to be supplied (steps S51–55 in FIG. 22). For the film rewinding operation, the motor 20 in the state of FIG. 18, illustrating a halfway of the film winding, is first driven to rotate counterclockwise toward the state shown in FIG. 17. Subsequently, the motor 20 is rotated clockwise to rotate the cam-gear 1. Namely, the first cam-gear 1 in the state of FIG. 17 is rotated counterclockwise until the encoder emits the high level signals from both terminals S1 and S2 so that cam 1g make the lock lever 15 rotate counterclockwise to disengage the claw 15b from the projection 19a of the carrier 19 (steps S56–58). The motor 20 is thereafter, rotated counterclockwise so that the carrier 19 is rotated counterclockwise. In this time, since the claw 15b is disengaged from the projection 19a, the carrier 19 continues its rotation until the planetary gear 18 becomes in engagement with the rewinding transmission gear 23, as shown in FIG. 19. Subsequently, the clockwise rotation of the motor 20 is transmitted to a gear train for rewinding the film through the gear 20a, the sun gear 17 the, planetary gear 18 and a film rewinding transmission gear 23. it is noted that, when it is the normal photographing mode, wherein the horizontaly and vertically pivotal movements of the camera are not carried out, the first cam-gear 1 is positioned as shown in FIG. 18 which presents the same position of the gear 1 as that of FIG. 16 so that the zooming operation can be effected by driving the zoom motor.

According to the above-described embodiment of the present invention, despite it is arranged that the five operation, i.e. the film winding and rewinding, zooming and horizontally and vertically pivotal movements of the camera, are effected by only two motors, their control is made by the 2-bits encoder. Therefore, the number of the components for the control is less and the control system is very simple.

Next, a first modification of the planetary gearing is described by making reference to FIGS. 23–27.

Figure 23:
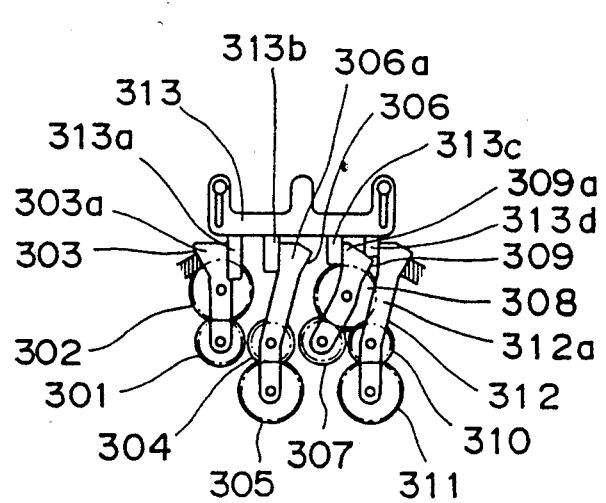
FIGS. 23-27, 28-32, and 33-35 are top plan views, respectively showing a first, second and a third modifications of the planetary gearing.

Referring first to FIG. 23 showing the arrangement of the planetary gearing, the reference numeral 301 denotes a gear to which the power is inputted from the zoom motor and which corresponds to the gear 3a shown in FIG. 5. Furthermore, gears 304, 307, 310 are arranged spaced slightly from each other in a line including the gear 301. These gears 301, 304, 307 and 310 are respectively supported by the shafts on which the arms 303, 306, 309 and 312 are respectively supported rotatably. The arms 303, 306, 309 and 312 have engagement ends 303a, 306a, 309a and 312a, respectively. The arms 303, 306, 309 and 312 also support the other gears 302, 305, 308 and 311 which are arranged alternately opposed each other with respect the arranging line of the gear 301, 304, 307 and 310 to be engaged therewith. An engagement member 313 is arranged above these gears, in FIG. 23, so as to be movable in a vertical direction, which is provided with a plurality of engagement projections 313a, 313b, 313c and 313d. The engagement member 313 is driven by a unshown driving means such as a motor or electrical magnet. The engagement member 313 corresponds to the lock lever 4 shown in FIG. 7 and is designed to be driven by the cam 2b of the second cam-gear 2.

Figure 24:
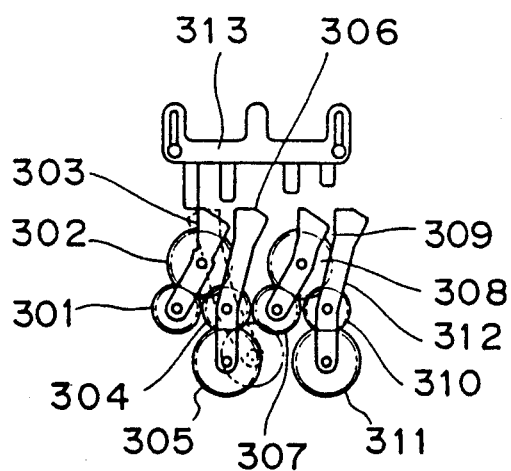

In FIG. 23, the power of the zoom motor is transmitted to the gear 302 through the gear 301. When the engagement member 313 is moved upwardly as shown in FIG. 24, the gear 302 becomes shiftable to engage the gear 304. Then, when the engagement member 313 is moved downwardly so that the projection 313a is engaged with the left side of the engagement end 303a of the arm 303, the power is transmitted to the gear 305 through the gears 301, 302 and 304. In this condition, the arm 306 is engaged by the projection 313b so that the gear 305 is fixedly located at a position indicated a solid line in FIG. 24. On the contrary, the arm 306 is rotatable from the solid line position to a broken line position in FIG. 24. When it is desired to output the power from the gear 305 indicated by the broken line in FIG. 24, the projection 313b is engaged with the right side of the engagement end 306a of the arm 306, as shown in FIG. 25.

Figure 25:
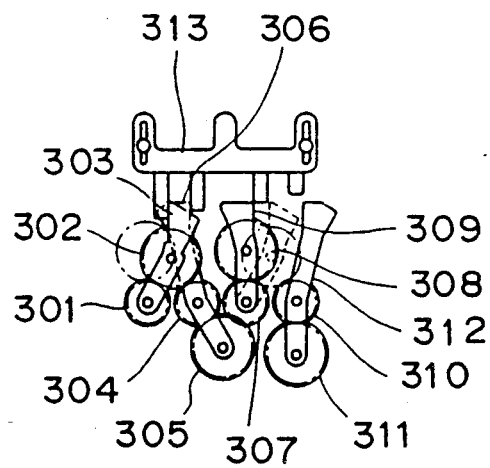
Figure 26:
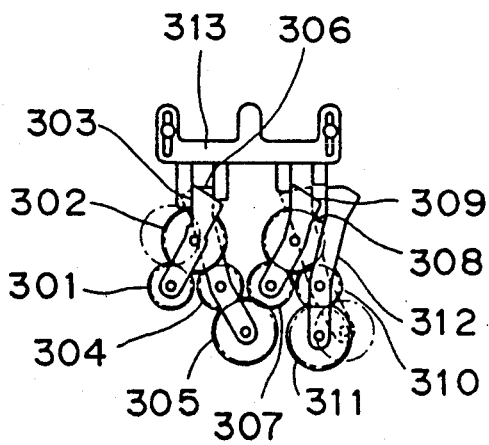
Figure 27:
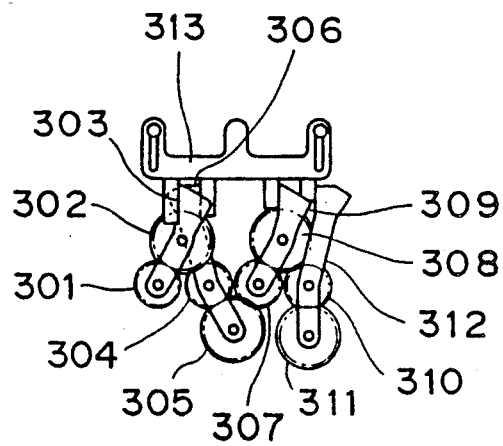
Figure 28:
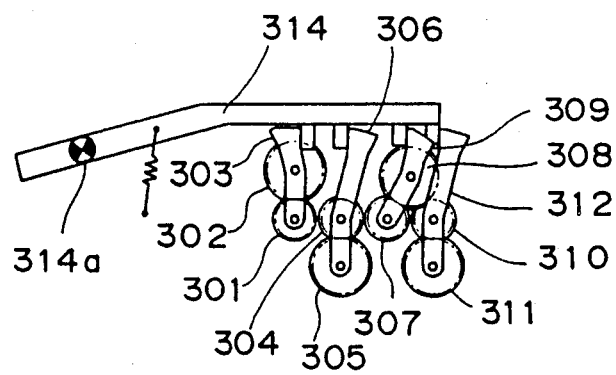
Figure 29:
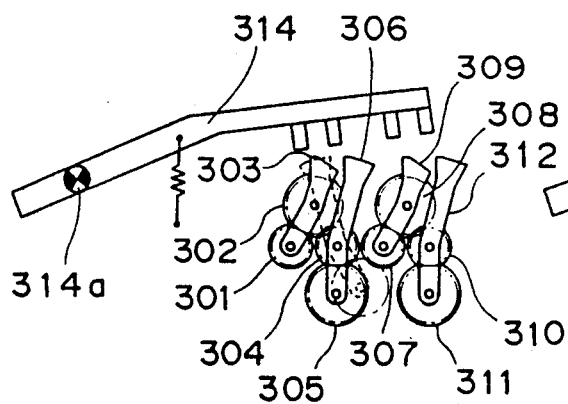
Figure 30:
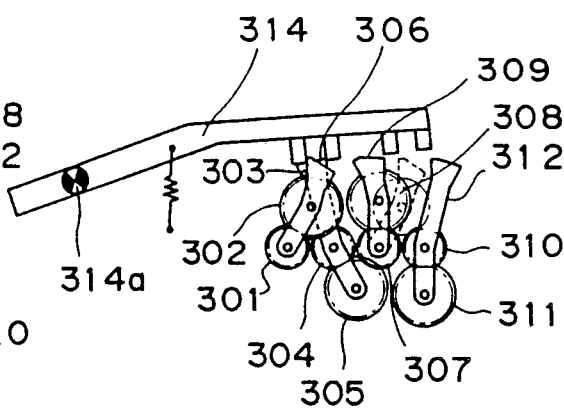
Figure 31:
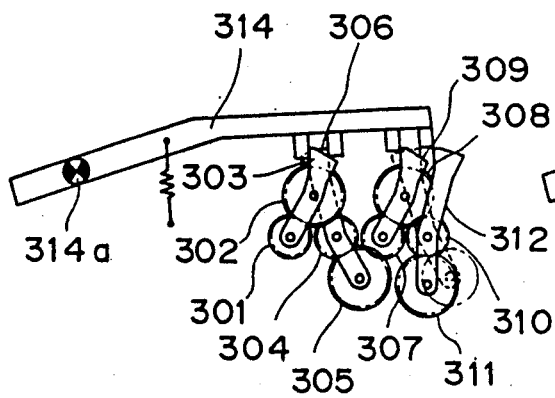
Figure 32:
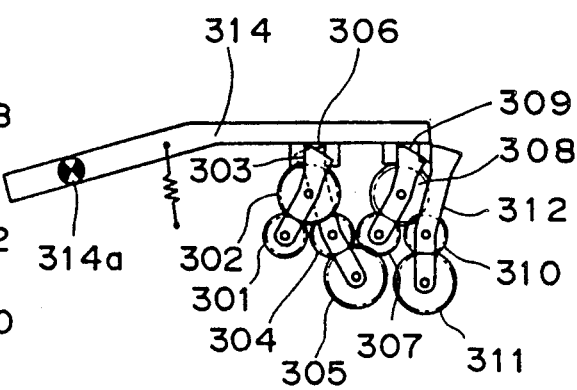

In this condition, as shown in FIG. 25, the gear 308 is shiftable from the solid line position to the broken line position. If the arm 309 is desired to be fixed at the broken line position, the engagement member 313 is located at a position as shown in FIG. 26. Namely, the projection 313c is engaged with the left side of the engagement end 309a of the arm 309. Further, the position of the gear 311 is selectable between the solid line position and the broken line position in FIG. 26 by the the selected position of the engagement member 313. Accordingly, the respective planetary gears 302, 305, 308 and 311 can take two positions, respectively and rotatable in both directions. According to the above-described embodiment, numerous planetary gears can be arranged.

FIGS. 28–32 shows a second modification of the planetary gearing. The arrangement of the respective gears is the same as that of FIG. 23. According to this modification, however, an engagement member 314 corresponding to the member 313 has one end supported rotatably by a fulcrum member 314a. This engagement member 314 is also able to be driven by a motor or an electrical magnet. As apparent from FIGS. 28–32, the construction and operation of the gears and arms are substantially the same as the previous first modification shown in FIGS. 23–27. Thus, the detailed description of the second modification is here omitted.

In addition, in the first and second modifications, since each engagement member 313 and 314 has four different positions, the cam 2a of the second cam-gear 2 should be provided with the additional two engagement faces as well as the faces 2c and 2d, and also the first cam-gear 1 should be provided with the additional two different gear sections and two different walls as well as the gear sections 1b and 1c and the walls 1d and 1e.

According to the first and second modifications, the same advantages as the first embodiment has can be achieved.

Still further, a third modification will be described below by making reference to FIGS. 33, 34 and 35.

Figure 33:
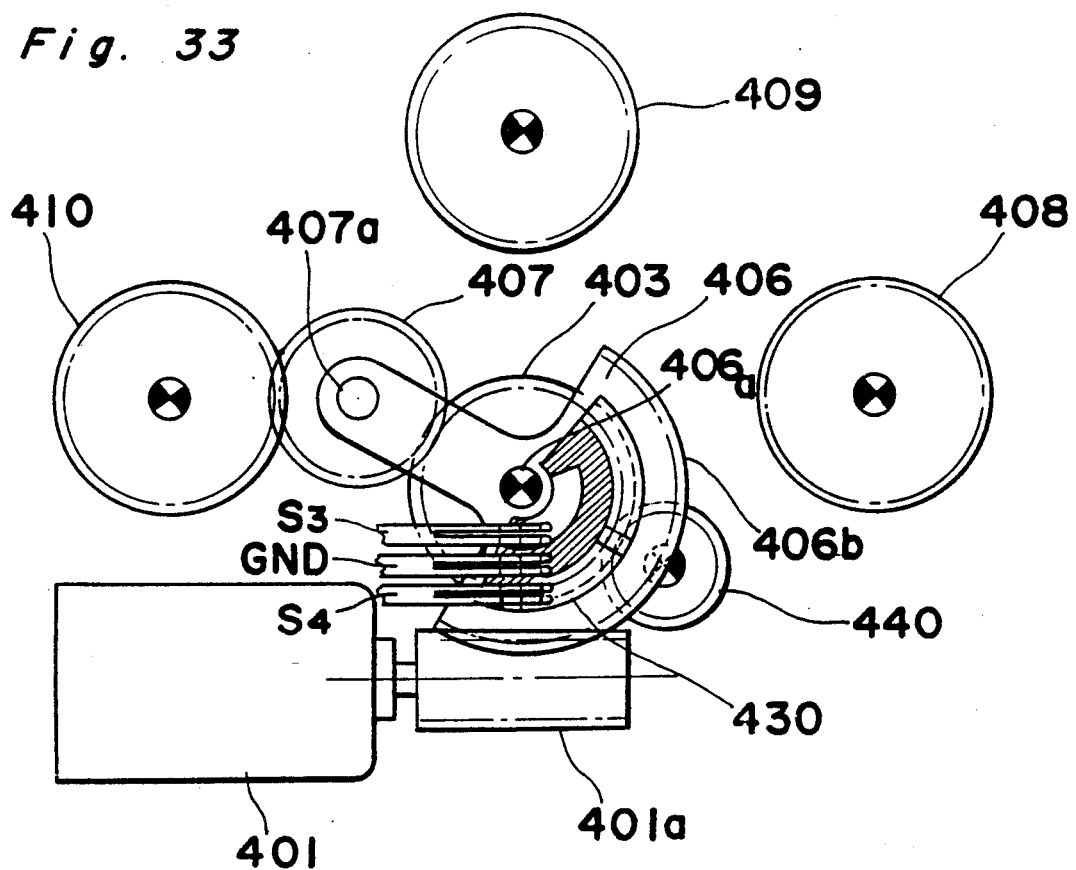

Referring to FIG. 33, a planetary carrier 406 is rotatably supported by the same shaft 406a which supports a sun gear 403. The carrier 406 has one end having a shaft 407 by which a planetary gear 407 is rotatably supported so as to engage the sun gear 403. Three transmission gears 408, 409 and 410 are arranged along the travelling locus of the planetary gear 407 around the sun gear 403 so as to receive the power from the sun gear 403.

The supported end of the carrier 406 has a sector gear 406b engaging a worm 401a driven by a carrier driving motor 401.

On the supported end of the carrier 406 is formed a semi-circular encoder pattern 430 which center corresponds to the shaft 406a. The reference symbols S3, S4 and GND are terminals contacting the encoder pattern 430. When the planetary gear 407 is engaged with the gear 408 (FIG. 35), the terminals S3 and GND are short-circuited by means of the encoder pattern 430 so that a low level signal is outputted from the terminal S3, while a high level signal is outputted from the terminal S4. When the planetary gear 407 is engaged with the gear 409 (FIG. 34), the terminals S4 and GND are short-circuited by means of the encoder pattern 430 so that a low level signal is outputted from the terminal S4, while a high level signal is outputted form the terminal S3. Finally, when the planetary gear 407 is engaged with the gear 410 (FIG. 33), both terminals S3 and S4 are short-circuited by the terminal GND so that the signals outputted from both terminals S3 and S4 become low level.

A drive gear 440 is engaged with the sun gear 403 to transmit the power from an unshown drive motor to the sun gear 403.

The operation of the above modification is described below in detail.

When the planetary gear 407 is engaged with the gear 410 as shown in FIG. 33, the power of the drive gear 440 is transmitted to the gear 410 through the sun gear 403 and the planetary gear 407. In this condition, when the motor 401 is rotated in a predetermined direction, its rotation is transmitted to the planetary carrier 406 through the worm 401a and the sector gear 406a, so that the carrier 406 is rotated clockwise. And, when the carrier 406 reaches the position shown in FIG. 34, wherein the planetary gear 407 is engaged with the gear 408, the terminals S4 and GND are short-circuited by the encoder pattern 430 so that low level signal is emitted from the terminal S4. Accordingly, the motor 401 is stopped by the signal and the power of the drive gear 440 is transmitted to the gear 409.

Figure 34:
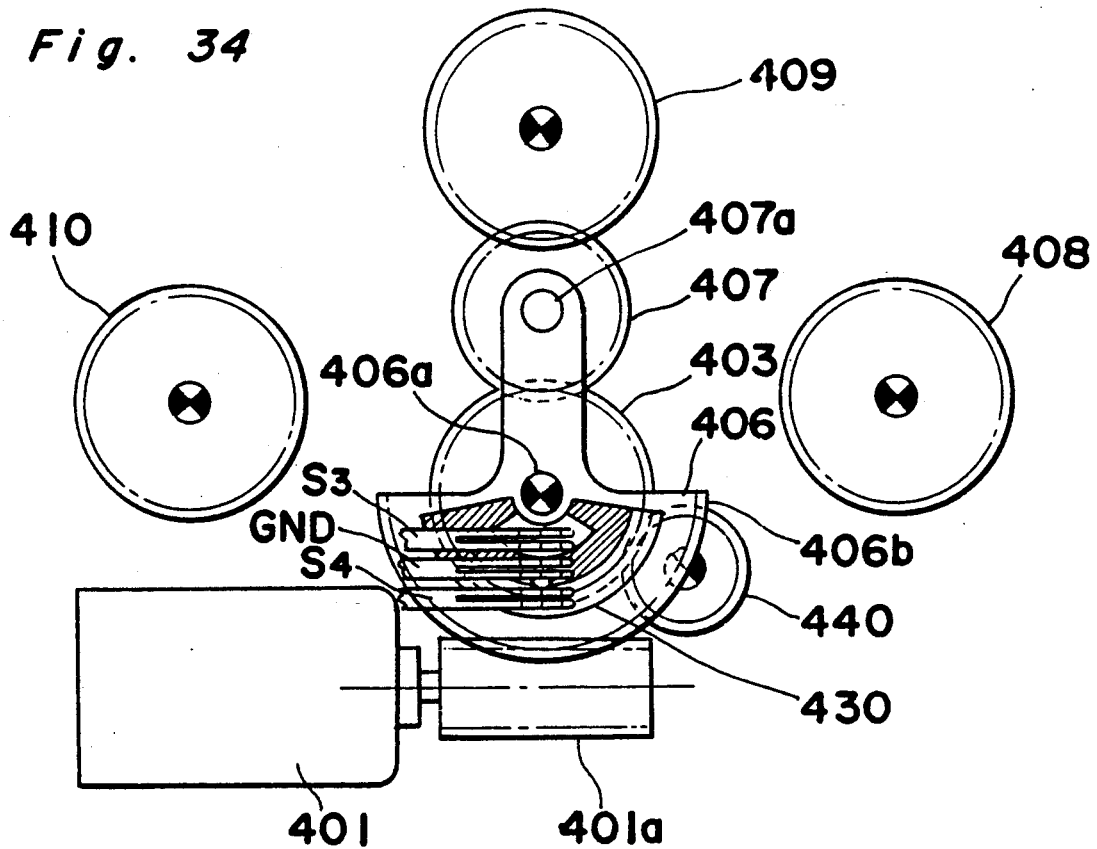

Under the condition such that the planetary gear 407 is engaged with the gear 409, when the sun gear 403 is rotated, the gear 409 is rotated around the shaft 407a through the planetary gear 407 since the carrier 406 is fixed at the position shown in FIG. 34 due to the engagement of the sector gear 406b and the worm 401a.

Figure 35:
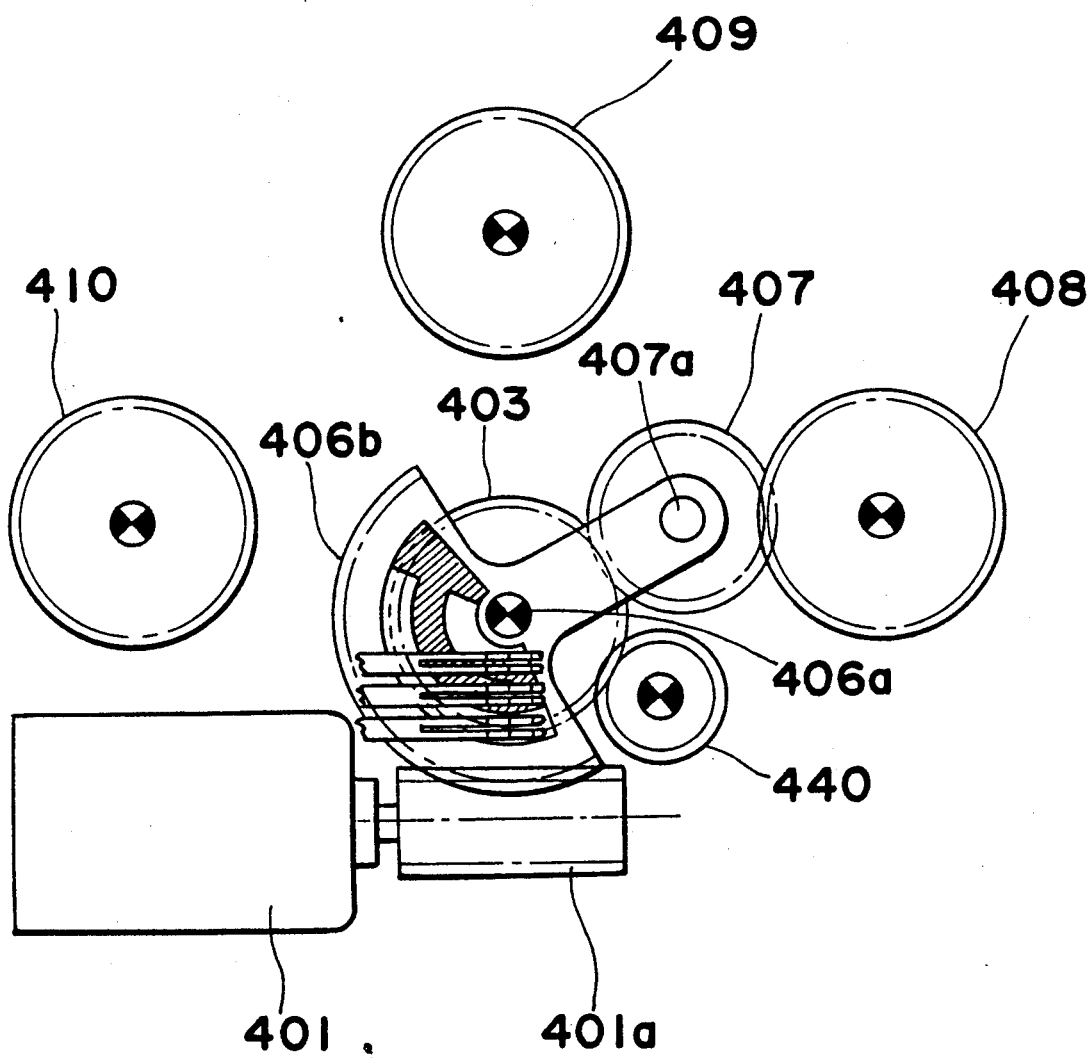

Next, when the motor 401 is again driven in the same manner as described above, similarly to the above the planetary gear 407 revolves around the sun gear 403 so that the planetary gear 407 is engaged with the gear 408 as shown in FIG. 35. Then, the signal outputted from the terminal S3 becomes low level so that the motor 401 is stopped.

On the contrary to the above, when the rotation of the motor 401 is reversal, the carrier 406 carrying the planetary gear 407 is rotated counterclockwise.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A planetary gearing comprising,
   a sun gear rotatable around a shaft,
   a planetary carrier rotatable around the shaft,
   a planetary gear rotatably supported by the planetary carrier to engage the sun gear,
   a plurality of transmission gears arranged around the sun gear to be selectively engaged with the planetary gear when the planetary gear revolves around the sun gear,
   stoppers provided on the planetary carrier, each corresponding to each of the transmission gears,
   an engagement lever which is rotatable to take a first position and a second position, the engagement lever at the first position holding the planetary carrier, by selectively engaging one of the stoppers, to make the planetary gear engage the corresponding transmission gear, while the engagement lever at the second position disengaging from the stoppers,
   cam means for rotating the engagement lever between the first and second positions, and
   control means for controlling a movement of the cam means so that the engagement lever rotates and stops at the first and second positions.

2. The planetary gearing according to claim 1, wherein the control means comprises,
   a stop lever for stopping the movement of the cam means by engaging the cam means, and
   a drive means for rotating the stop lever.

3. The planetary gearing according to claim 1, wherein the engagement lever is urged by spring means in one rotational direction to engage the stoppers, while the cam means may move to rotate the engagement lever in a reverse direction against an urging of the spring so as to disengage from the stopper, when desired.

4. The planetary gearing according to claim 2, wherein the drive means comprises,
   a rotatable gear
   a cam member mounted on the rotatable gear to rotate the stop lever by engaging the stop lever in accordance with a rotational position of the rotatable gear.

5. The planetary gearing according to claim 1, wherein the stoppers have recesses corresponding to the transmission gears, rotation of the planetary carrier in both directions being prevented by an insertion of the engagement lever into one of the recesses.

6. The planetary gearing according to claim 4, wherein the rotatable gear is in association with the cam means to rotate the cam means so that the engagement lever rotates between the first and second positions.

7. A drive apparatus comprising,
   a first motor rotatable in both directions,
   a sun gear rotatable around a shaft,
   a planetary carrier rotatable around the shaft,
   a planetary gear rotatably supported by the planetary carrier to engage the sun gear,
   at least three transmission gears arranged around the sun gear to engage the planetary gear,
   positioning means for positioning the planetary carrier at predetermined positions such that a rotation of the first motor is selectively transmitted to one of the transmission gears through the planetary gear, and a drive means for driving the positioning means.

8. The drive apparatus according to claim 7, wherein the positioning means comprises, a plurality of engagement portions formed on the planetary carrier, and an engagement member driven by the drive means, which is supported to be movable between a first position for an engagement with the engagement portions, and a second position for disengagement from the engagement portions.

9. The drive apparatus according to claim 7, wherein the drive means includes a second motor.

10. The drive apparatus according to claim 8, wherein the drive means includes a second motor.

11. A drive apparatus comprising, a first motor rotatable in both directions, a first gear driven by the first motor, a plurality of transmission gears engageable with the first gear, a carrier for movably supporting the first gear to selectively engage one of the transmission gears, positioning means for positioning the carrier at predetermined positions, by engaging the carrier, such that the first gear is engaged with one of the transmission gears so that a rotation of the first motor is selectively transmitted to one of the transmission gears through the first gear, and a drive means for driving the positioning means.

12. The drive apparatus according to claim 11, wherein the positioning means comprises, a plurality of engagement portions formed on the carrier, and an engagement member driven by the drive means, which is supported to be movable between a first position for an engagement with the engagement portions, and a second position for a disengagement from the engagement portions.

13. The drive apparatus according to claim 11, wherein the drive means includes a second motor.

14. The drive apparatus according to claim 12, wherein the drive means includes a second motor.

15. A drive apparatus comprising, a first motor rotatable in both directions, a first gear driven by the first motor, a plurality of transmission gears engageable with the first gear, a carrier for movably supporting the first gear to selectively engage one of the transmission gears, and drive means for driving the carrier at predetermined positions, by engaging the carrier, such that the first gear is engaged with one of the transmission gears so that a rotation of the first motor is selectively transmitted to one of the transmission gears through the first gear.

16. The drive apparatus according to claim 15, wherein the drive means includes a second motor.

17. A planetary gearing comprising, a sun gear rotatable around a shaft, a planetary carrier rotatable around the shaft, a planetary gear rotatably supported by the planetary carrier to engage the sun gear, at least three transmission gears arranged around the sun gear to be selectively engaged with the planetary gear when the planetary gear revolves around the sun gear, an engagement lever for positioning the planetary carrier by engaging the planetary carrier, first and second control means for controlling an operation of the engagement lever, a plurality of engagement portions formed on the planetary carrier and engageable with the engagement lever to hold the planetary carrier at predetermined positions such that the planetary gear selectively engage one of the transmission gears, and cam means provided on the second control means to operate the engagement lever, the cam means being movable between a first stop position, for making the engagement lever engage one of the engagement portions by control of the first control means and second stop position for permitting the carrier to move a desired engagement position by releasing the engagement of the engagement lever with one of the engagement portions.

* * * * *

UNITED STATES PATENT AND TRADEMARK OFFICE
CERTIFICATE OF CORRECTION

PATENT NO. : 5,094,116
DATED : March 10, 1992
INVENTOR(S) : Dai Shintani

It is certified that error appears in the above-identified patent and that said Letters Patent is hereby corrected as shown below:

In col. 2, line 26, change "When" to --when--.

In col. 2, line 45, after "lever" insert --,-- (comma).

In col. 3, line 38, change "members" to --member-.

In col. 9, line 33, change "a" to --an unshown--.

In col. 9, line 34, change "17 the, planetary" to --17, the planetary--.

In col. 9, line 35, after "gear 23", delete "." (period) and insert --, and--.

On the cover page, in line 1 of the Abstract paragraph, change "An" to --A--.

Signed and Sealed this

Eighth Day of June, 1993

Attest:

MICHAEL K. KIRK

*Attesting Officer*    *Acting Commissioner of Patents and Trademarks*